United States Patent [19]
Naka et al.

[11] Patent Number: 5,572,252
[45] Date of Patent: Nov. 5, 1996

[54] VIDEO CAMERA HAVING ERRONEOUS RECORDING PREVENTING FUNCTION AND METHOD THEREOF

[75] Inventors: Masafumi Naka; Kozo Ishida, both of Nagaokakyo, Japan

[73] Assignee: Mitsubishi Denki Kabushiki Kaisha, Tokyo, Japan

[21] Appl. No.: 496,049

[22] Filed: Jun. 28, 1995

Related U.S. Application Data

[63] Continuation of Ser. No. 86,124, Jul. 6, 1993, abandoned.

[30] Foreign Application Priority Data

Jul. 10, 1992 [JP] Japan .................................. 4-183741
Mar. 1, 1993 [JP] Japan .................................. 5-039726

[51] Int. Cl.⁶ .......................................... H04N 5/228
[52] U.S. Cl. ................................ 348/208; 396/52
[58] Field of Search ........................... 348/64, 208, 214, 348/219, 346; 354/202, 430, 432; 352/131; H04N 5/228

[56] References Cited

U.S. PATENT DOCUMENTS

| | | | |
|---|---|---|---|
| 5,012,270 | 4/1991 | Sekine et al. | 348/208 |
| 5,109,249 | 4/1992 | Kitajima | 354/430 |
| 5,210,620 | 5/1993 | Kim | 358/335 |
| 5,235,427 | 8/1993 | Kim | 348/208 |

FOREIGN PATENT DOCUMENTS

| | | | |
|---|---|---|---|
| 4135643 | 5/1992 | Germany | G11B 31/00 |
| 4-90273 | 3/1992 | Japan | H04N 5/225 |
| 4-090273 | 7/1992 | Japan | H04N 5/217 |

OTHER PUBLICATIONS

M. Oshima et al.; "VHS Camcorder With Electronic Image Stablizer"; Nov., 1989 (IEEE Transactions on Consumer Electronics vol. 35, No. 4, pp. 749–757.

*Primary Examiner*—Michael Horabik
*Assistant Examiner*—Michael Day

[57] ABSTRACT

A video camera wherein the number of times that an output signal from a swing sensor reaches or exceeds a threshold value is counted, and based on the resulting counted value, the video camera is judged as being in a photographing state or not, the recording operation being stopped if the video camera is judged to be not in a photographing state. When the counted value has reached a predetermined value, the operator of the video camera is notified of a faulty photographing condition. Furthermore, it is judged, based on the detection result of the swing sensor, whether the video camera is in a misrecording operation; if the video camera is judged to be in a misrecording operation, the recording operation is stopped, and then, the recording tape is rewound to the start position of the misrecording.

83 Claims, 30 Drawing Sheets

Fig. 17(a)

VPA = (INPUT VALUE IN PITCHING DIRECTION) − (REFERENCE VALUE)
VYA = (INPUT VALUE IN YAWING DIRECTION) − (REFERENCE VALUE)

(S40)

(S41) VPA POSITIVE?

YES → (S42) VYA POSITIVE?
- YES (S43):
  - VPA ≥ VTH : 1COUNT
  - VPA < VTH : 0COUNT
  - VYA ≥ VTH : 1COUNT
  - VYA < VTH : 0COUNT
  - VPBN : 0COUNT
  - VYBN : 0COUNT
- NO (S44):
  - VPA ≥ VTH : 1COUNT
  - VPA < VTH : 0COUNT
  - −VYA ≥ VTH : 1COUNT
  - −VYA < VTH : 0COUNT
  - VPBN : 0COUNT
  - VYBP : 0COUNT

NO → (S45) VYA POSITIVE?
- YES (S46):
  - −VPA ≥ VTH : 1COUNT
  - −VPA < VTH : 0COUNT
  - VYA ≥ VTH : 1COUNT
  - VYA < VTH : 0COUNT
  - VPBP : 0COUNT
  - VYBN : 0COUNT
- NO (S47):
  - −VPA ≥ VTH : 1COUNT
  - −VPA < VTH : 0COUNT
  - −VYA ≥ VTH : 1COUNT
  - −VYA < VTH : 0COUNT
  - VPBP : 0COUNT
  - VYBP : 0COUNT

→ ①

ANGULAR VELOCITY SIGNAL IN PITCHING DIRECTION

Fig. 19  ANGULAR VELOCITY SIGNAL IN YAWING DIRECTION

Fig. 21 COUNTED VALUE SPN OF NEGATIVE LEVEL DIFFERENCE IN PITCHING DIRECTION

Fig. 22 COUNTED VALUE SYP OF POSITIVE LEVEL DIFFERENCE IN YAWING DIRECTION

COUNTED VALUE SYN OF
NEGATIVE LEVEL DIFFERENCE
IN YAWING DIRECTION

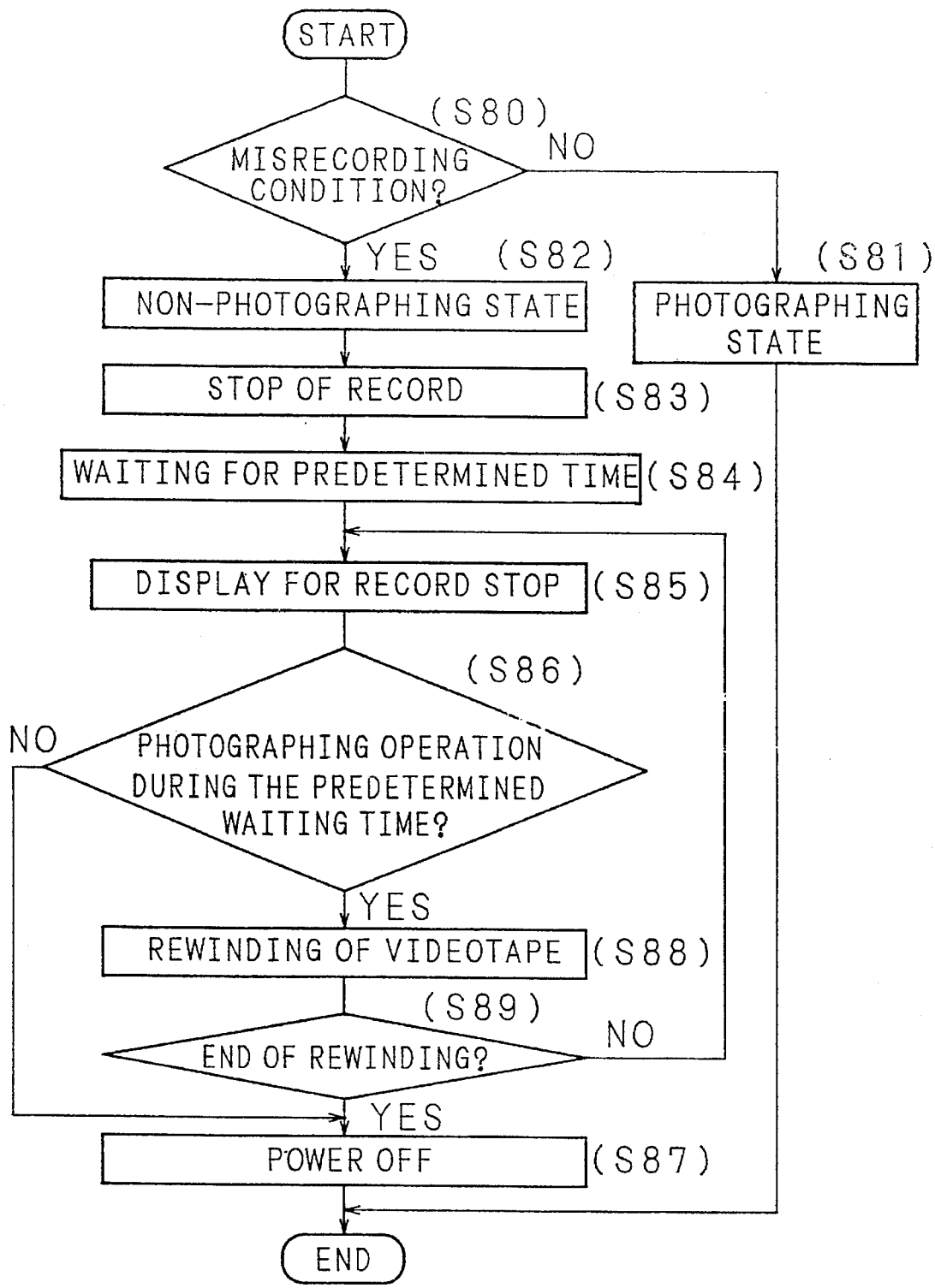

VIDEO CAMERA HAVING ERRONEOUS RECORDING PREVENTING FUNCTION AND METHOD THEREOF

This application is a continuation of application Ser. No. 08/086,124 filed on Jul. 6, 1993, now abandoned.

BACKGROUND OF THE INVENTION

1. Field of the Invention

The present invention relates to a video camera (a VTR provided with a camera) for recording an object captured by the camera.

2. Description of Related Art

FIG. 1 is a block diagram showing an essential configuration of a prior art video camera disclosed in Japanese Patent Unexamined Publication No.4-90273. A power switch 24 used to cut off power is connected to a power supply circuit 25. Supplied to a power cutoff circuit 27 are: a contact detection signal 32 from a contact detection circuit 31 that detects the opening, after the closure, of a contact switch provided on the grip of the video camera; a swing detection signal 29 from a swing detection circuit 30 that detects a swinging motion of the video camera; and a record ON signal 28 that is output during a recording operation. The power cutoff circuit 27 outputs a power cutoff signal 26 which is supplied to the power supply circuit 25.

The operation of the above video camera will be described below. When the contact switch provided on the grip of the video camera is closed by the pressure of the hand holding the grip, the contact detection circuit 31 does not output the contact detection signal 32. The contact detection signal 32 is output and supplied to the power cutoff circuit 27 when the pressure is released from the contact switch. The swing detection circuit 30 detects a swinging motion of the video camera by means of an angular velocity sensor (not shown) built in the video camera, and upon detection of the swinging motion, supplies the swing detection signal 29 to the power cutoff circuit 27. The video camera has a construction such as shown in FIG. 2. When an operator is carrying the video camera VC by gripping a handle H in his hand, the video camera VC is lightly swung back and forth as he walks. This swinging motion is detected by the angular velocity sensor built in the video camera. When the video camera is in a recording operation, the record ON signal 28 that signifies that the video camera is recording is supplied to the power cutoff circuit 27. While the recording ON signal 28 is being supplied to the power cutoff circuit 27, if the application of the swing detection signal 29 continues for a predetermined length of time (for example, one minute), the power cutoff signal 26 is supplied to the power supply circuit 25 to cut off the power of the video camera VC.

In recent years, video cameras have been drastically reduced both in size and weight, and video cameras without such a carrying handle as shown in FIG. 2 are a general trend. Furthermore, video cameras generally known as single-hand video movie cameras are so designed that, when not photographing, the operator carries the video camera with his hand placed on the grip which is usually used to hold the camera during photographing, or the video camera is carried in a shoulder bag or the like or on a shoulder strap attached to the camera.

Thus, as the video camera becomes smaller and lighter, the method of carrying it has been changing. Since the video cameras that can be carried with the operator's hand placed on the grip are not provided with a carrying handle, no such signal as supplied from the contact detection circuit described above can be obtained to cut off power when the video camera is being carried. Furthermore, when the video camera is carried in a shoulder bag or the like, the swinging directions of the video camera are not determined, and the amount of its swinging movement is usually smaller than when it is carried with its grip held by hand, so that the level of the output signal of the angular velocity sensor becomes smaller. When it is carried on a shoulder strap, the swinging directions of the video camera are not determined, as in the above case; therefore, it is difficult to judge whether the video camera is being operated for photographing a scene or is just being carried. Accordingly, recent video cameras without a carrying handle have the problem that when the camera is carried around while being mistakenly left in a record mode, the recording operation is allowed to continue, and misrecording cannot be prevented. Another problem is that if the video camera is subjected to heavy shaking while photographing a scene, thus adversely affecting the quality of the captured image, the operator may not notice the adverse photographing condition and may continue the photographing operation as he is so absorbed in photographing the scene. There is the further problem that once misrecording is done, the misrecorded portions remain recorded on tape, which, when replayed, reproduces misrecorded, jarring images here and there.

SUMMARY OF THE INVENTION

It is an object of the invention to provide a video camera that is capable of preventing misrecording by stopping the recording operation when the video camera is carried around while being left in a record mode due to misoperation on the side of the operator.

It is another object of the invention to provide a video camera that can notify the operator of a faulty photographing condition when the photographing of a scene is continued while shaking the video camera.

It is a further object of the invention to provide a video camera in which when misrecording is done, the misrecorded portions will not remain recorded on tape.

According to a first video camera of the invention, a swinging motion of the video camera is detected by a swing sensor, and the number of times that the output signal of the swing sensor goes beyond a predetermined value in a predetermined time is counted; based on the counted value, a decision is made as to whether the video camera is in a photographing state or is just being carried, and when it is not in a photographing state, the recording operation is stopped. In this manner, when the video camera is carried around while being left in a record mode due to misoperation on the side of the operator, the recording operation automatically stops to prevent unwanted recording.

According to a second video camera of the invention, a swinging motion of the video camera is detected by a swing sensor, and the number of times that the output signal of the swing sensor goes beyond a first predetermined value in a predetermined time is counted; when the counted value has reached a second predetermined value, the operator of the camera is notified of a faulty photographing condition. More specifically, when the photographing of a scene is continued while heavily shaking the video camera, if the captured image condition is bad, such condition is notified to the operator to alert him to the possibility of misrecording; therefore, the photographing of a scene can be readily stopped when the photographing condition has worsened.

According to a third video camera of the invention, a swinging motion of the video camera is detected by a swing sensor, and based on the result of the detection, a decision is made as to whether the video camera is in a misrecording condition; if it is decided that the video camera is in a misrecording condition, the recording operation is stopped, and after that, the recording tape is rewound to the misrecording start position. Thus, when misrecording is done under faulty photographing conditions, the recording tape is rewound to the misrecording start position; therefore, the misrecorded portions of the object photographed under such faulty conditions will not remain recorded on the tape, thus recording only objects that have been intentionally photographed by the operator under proper photographing conditions.

The above and further objects and features of the invention will more fully be apparent from the following detailed description with accompanying drawings.

BRIEF DESCRIPTION OF THE DRAWINGS

FIG. 17(a) is part of a flowchart showing a control procedure for a microcomputer shown in FIG. 16.

FIG. 28 is a flowchart showing still another control procedure for the microcomputer shown in FIG. 25.

DESCRIPTION OF THE PREFERRED EMBODIMENTS

The preferred embodiments of the invention will be described in detail below with reference to the accompanying drawings.

Figure 1:
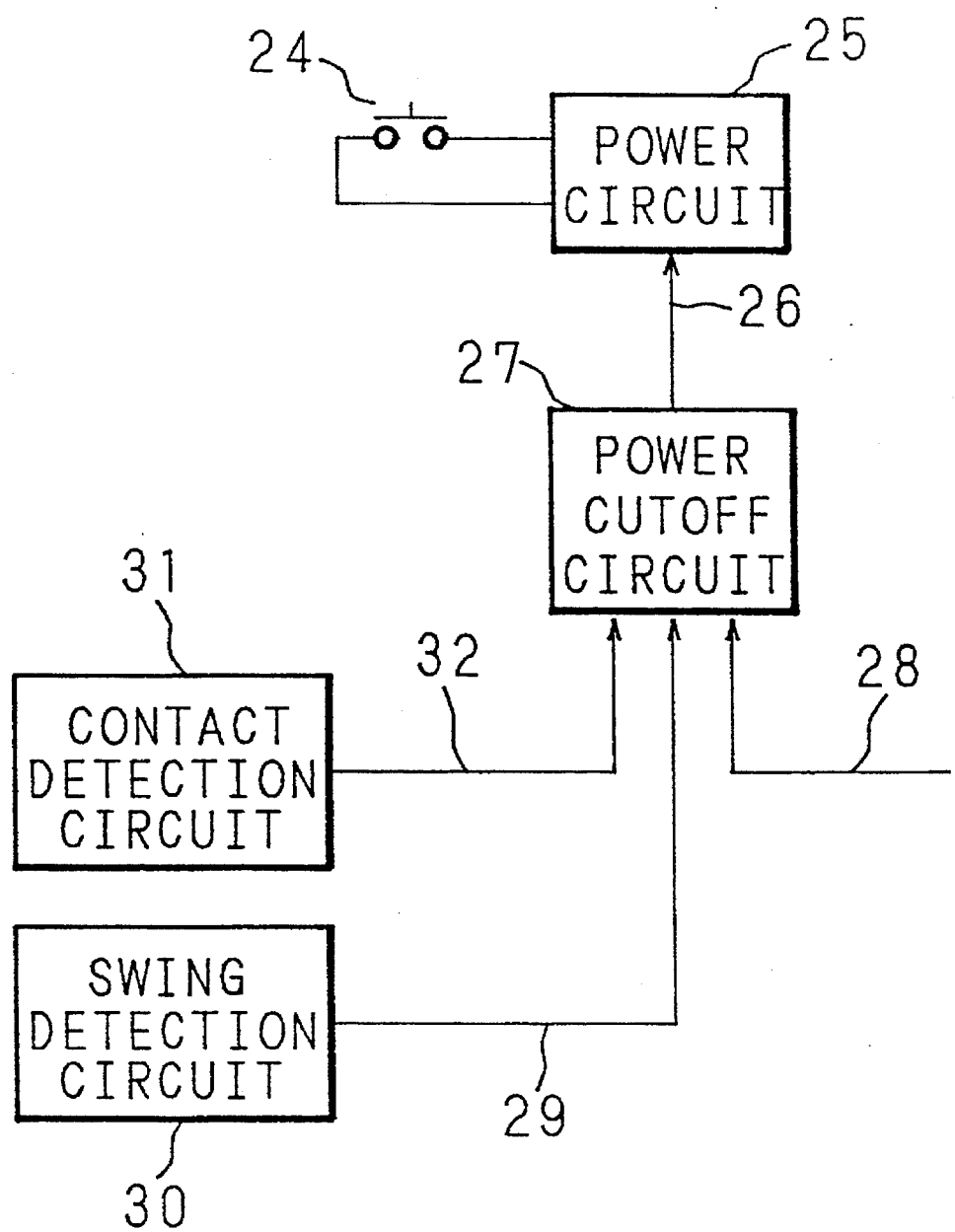
FIG. 1 is a block diagram showing an essential configuration of a prior art video camera.
Figure 2:
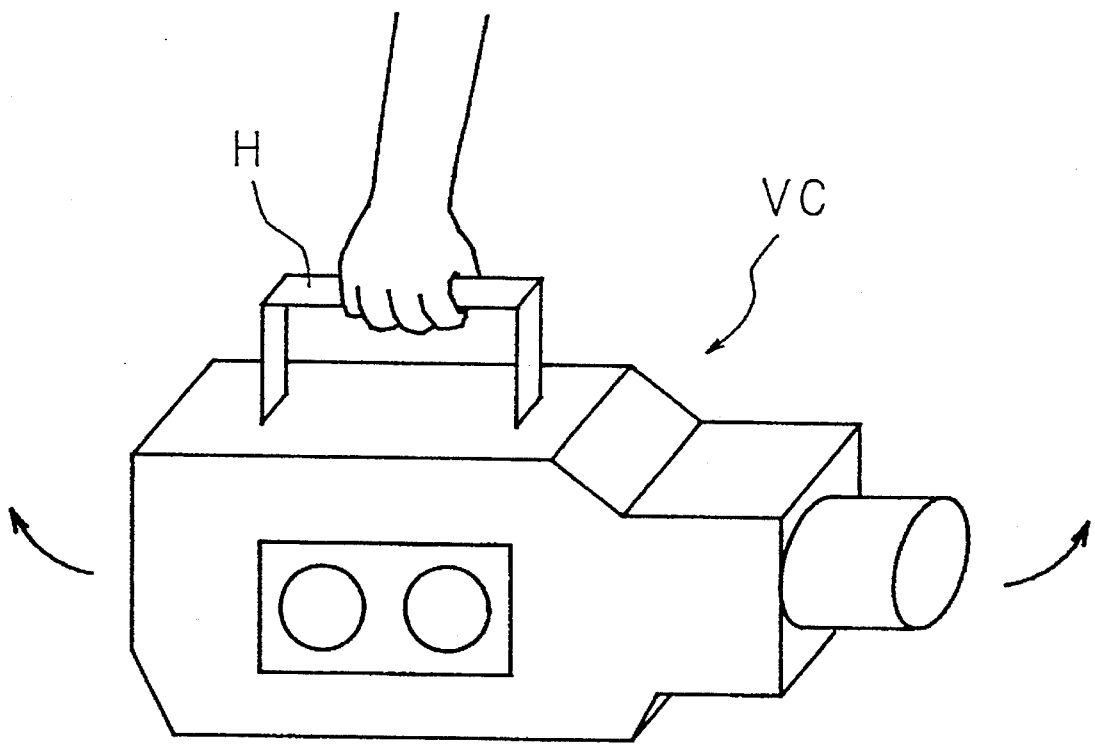
FIG. 2 is a schematic perspective view of the prior art video camera.
Figure 3:
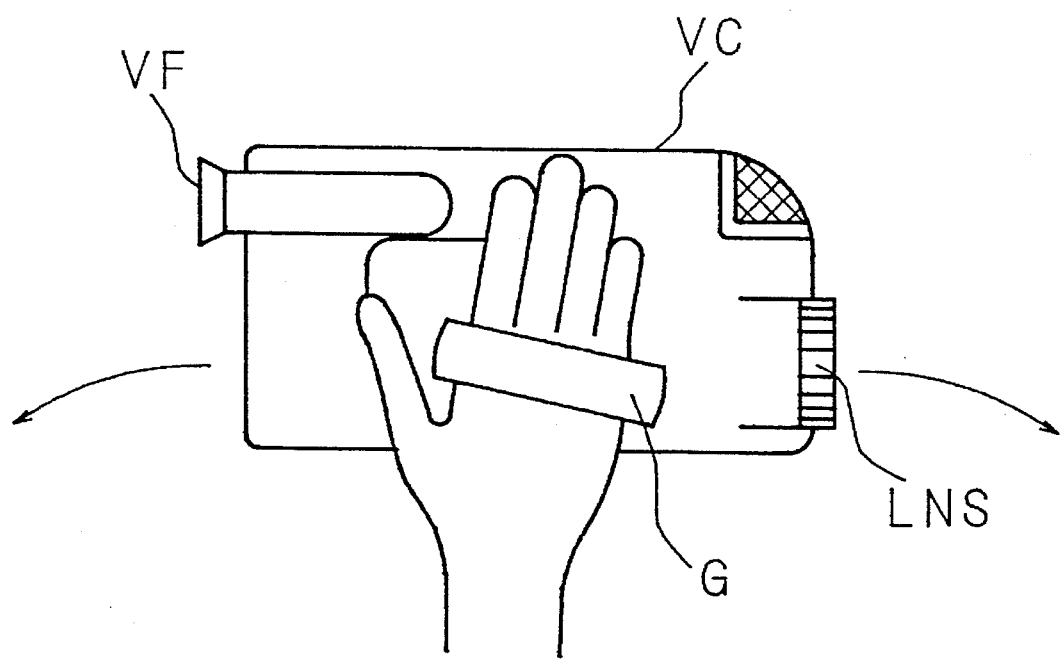
FIG. 3 is a schematic perspective view of a video camera according to the invention.

FIG. 3 is a schematic side view of a video camera according to the invention. At the front of the video camera VC is a lens LNS through which light from an object is admitted into the video camera VC. A viewfinder VF is provided on the right-hand side of the back of the video camera VC. Centrally placed on the right-hand side of the video camera VC is a grip G. The video camera VC contains a built-in angular velocity sensor (not shown) which acts as a swing sensor.

Figure 4:
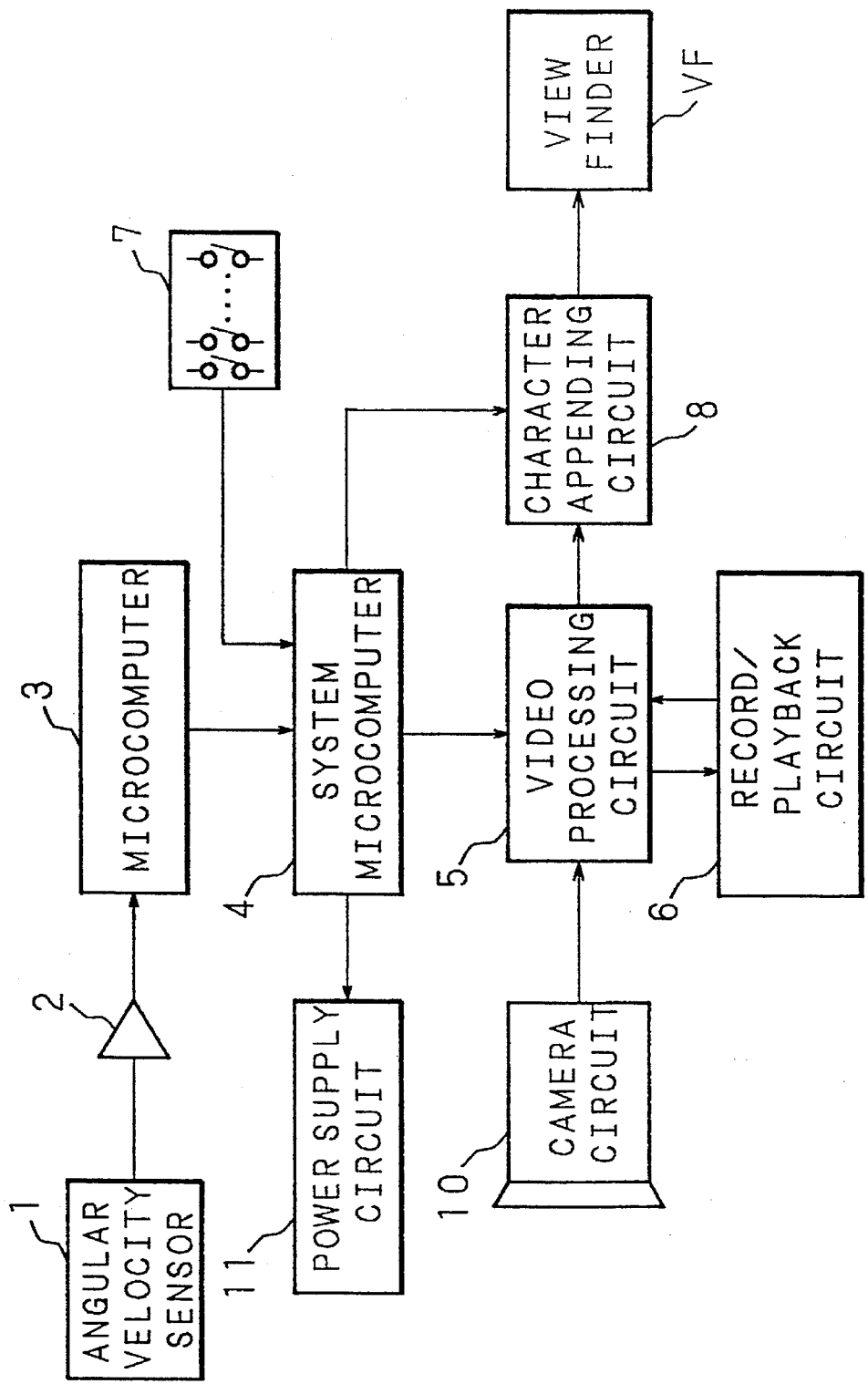
FIG. 4 is a block diagram showing an essential configuration of one embodiment of the video camera according to the invention.

FIG. 4 is a block diagram showing an essential configuration of the video camera according to a first embodiment of the invention. An angular velocity sensor 1 detects the swinging motion of the video camera in the arrow directions shown in FIG. 3, that is, in pitching directions. An output signal from the angular velocity sensor 1 is fed to a microcomputer 3 via an amplifier 2, and a control signal from the microcomputer 3 is supplied to a system microcomputer 4. The microcomputer 3 converts an analog signal output from the amplifier 2 into a digital signal, counts the number of signals greater than a predetermined angular velocity in a predetermined time, and determines whether the resulting counted value has exceeded a predetermined value. The system microcomputer 4 that controls the system of the video camera VC is supplied with signals from a key array 7 provided on the video camera for operation. A control signal from the system microcomputer 4 is supplied to a power supply circuit 11, a video processing circuit 5, and a character appending circuit 8.

The light admitted through the lens LNS is converted by a camera circuit 10 into electrical signals. A video signal output from the camera circuit 10 is supplied to the video processing circuit 5, and a video signal output from the video processing circuit 5 is given to the character appending circuit 8 which appends character data to the video signal. A video signal output from the character appending circuit 8 is given to the viewfinder VF. The video signal output from the video processing circuit 5 is also supplied to a record/playback circuit 6 which records the video signal on a recording tape; the record/playback circuit 6 also plays back a video signal from the recording tape and supplies the playback video signal to the video processing circuit 5.

Figure 5:
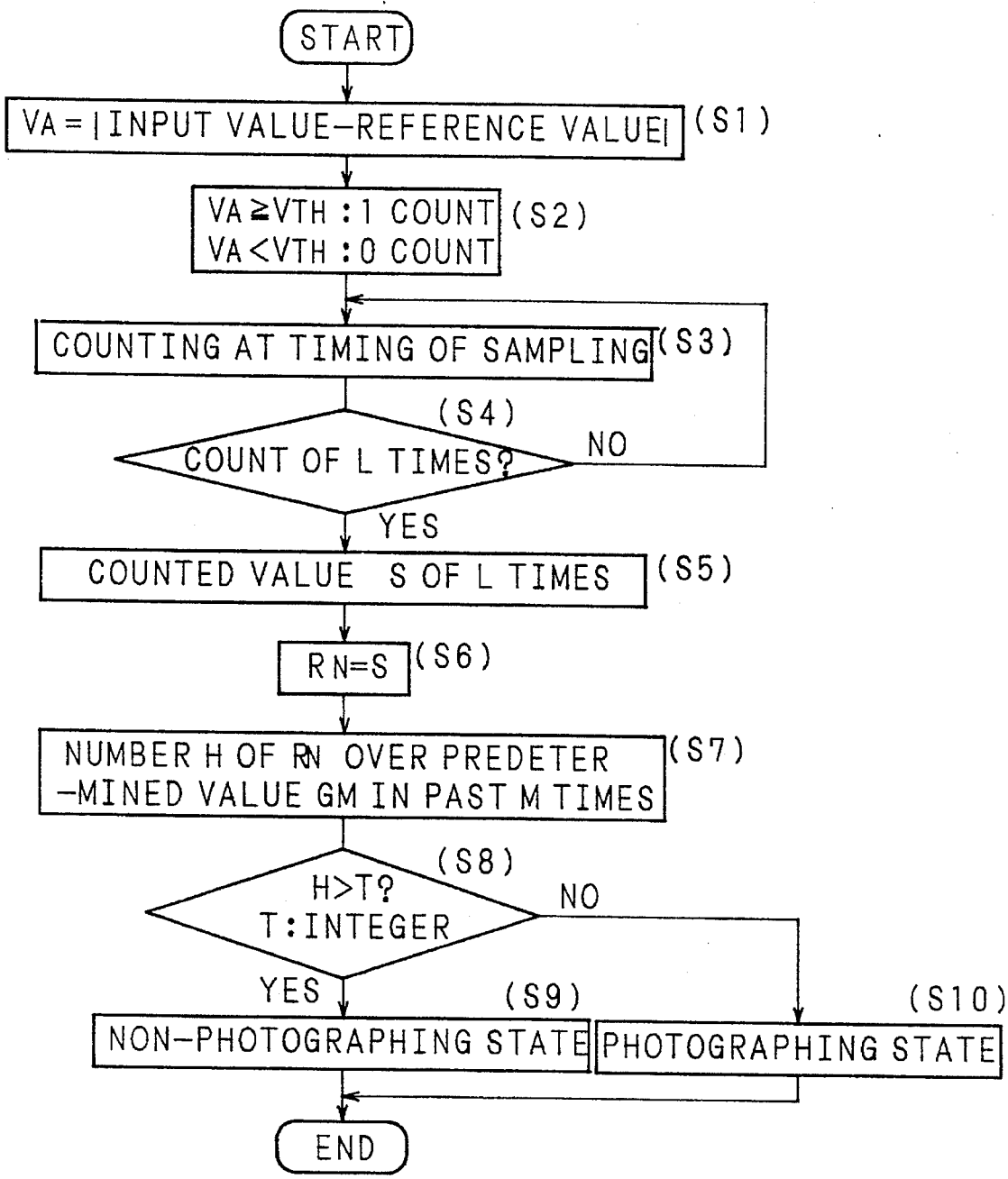
FIG. 5 is a flowchart showing a control procedure for a microcomputer shown in FIG. 4.

The operation of the video camera of the above configuration will be described below with reference to the flowchart of FIG. 5 which shows a control procedures for the microcomputer 3. An angular velocity signal output from the angular velocity sensor 1 and amplified by the amplifier 2 is supplied to the microcomputer 3 where the signal is input to an analog/digital converter (not shown) internal to the microcomputer 3. The microcomputer 3 performs mathematical operations on the input angular velocity signal to determine whether the currently input angular velocity signal is one that has been generated from a photographing action. More specifically, when the angular velocity signal from the angular velocity sensor 1 is input to the microcomputer 3, the microcomputer 3 calculates a level difference $V_A$ between the input value and a reference value (S1). Next, "1" is counted if the calculated level difference $V_A$ is equal to or greater than a threshold value $V_{TH}$, and "0" is counted if it is smaller than the threshold value $V_{TH}$ (S2). The "1" and "0" are counted at the sampling timing of the angular velocity signal on both the positive and negative sides of the signal (S3). It is then determined whether the number of times has reached a predetermined number of times, L, in a predetermined time (S4), and when the number of times, L, is reached, a counted value S is obtained for the L times (S5). As each counted value S is obtained for the L times, the counted value S is fed to a memory (not shown) internal to the microcomputer 3; each time it is fed to the memory, the counted value S is written at a different address $R_N$ in the memory (S6).

Figure 6:
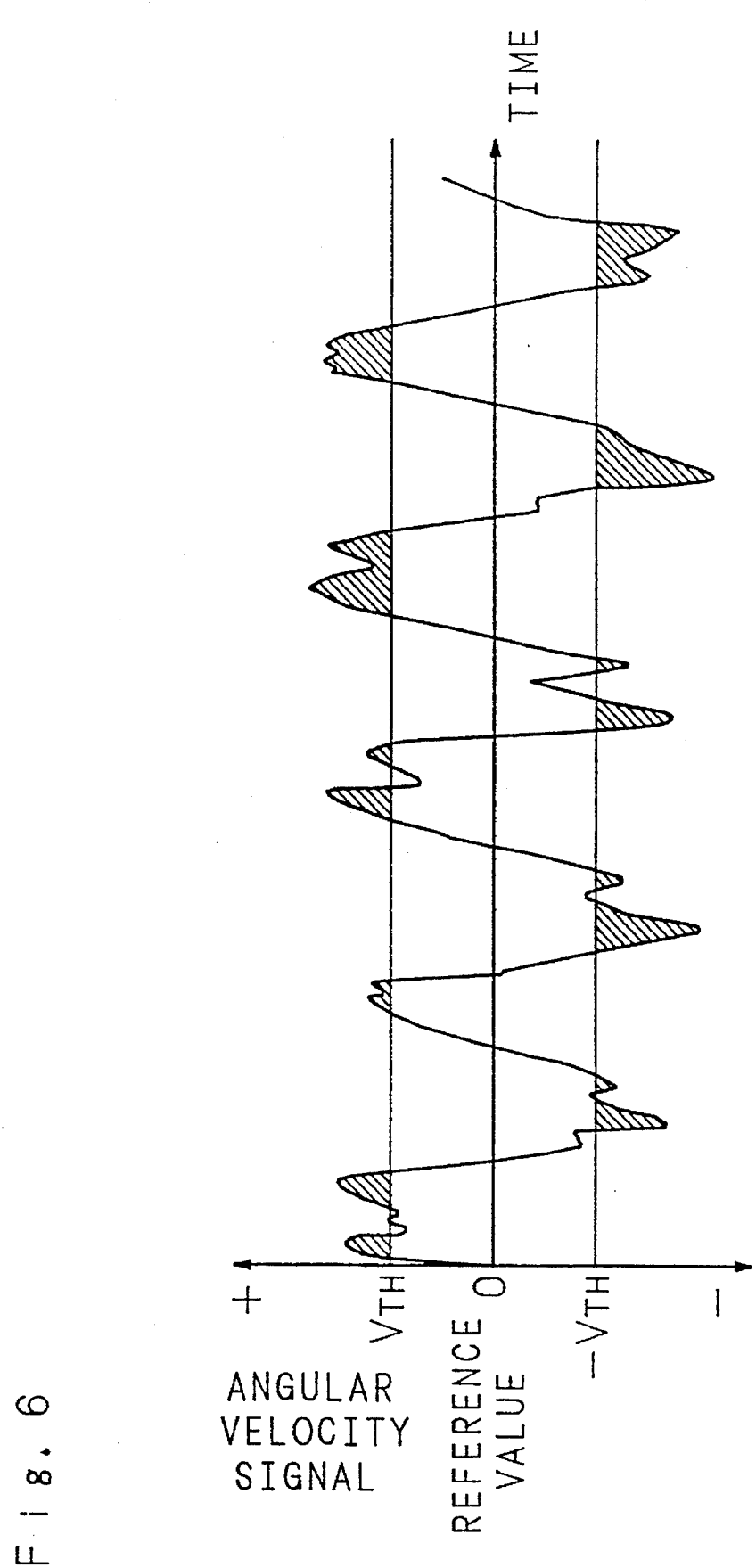
FIG. 6 is a diagram showing the waveform of an angular velocity signal when the video camera is not in a photographing state.
Figure 7:
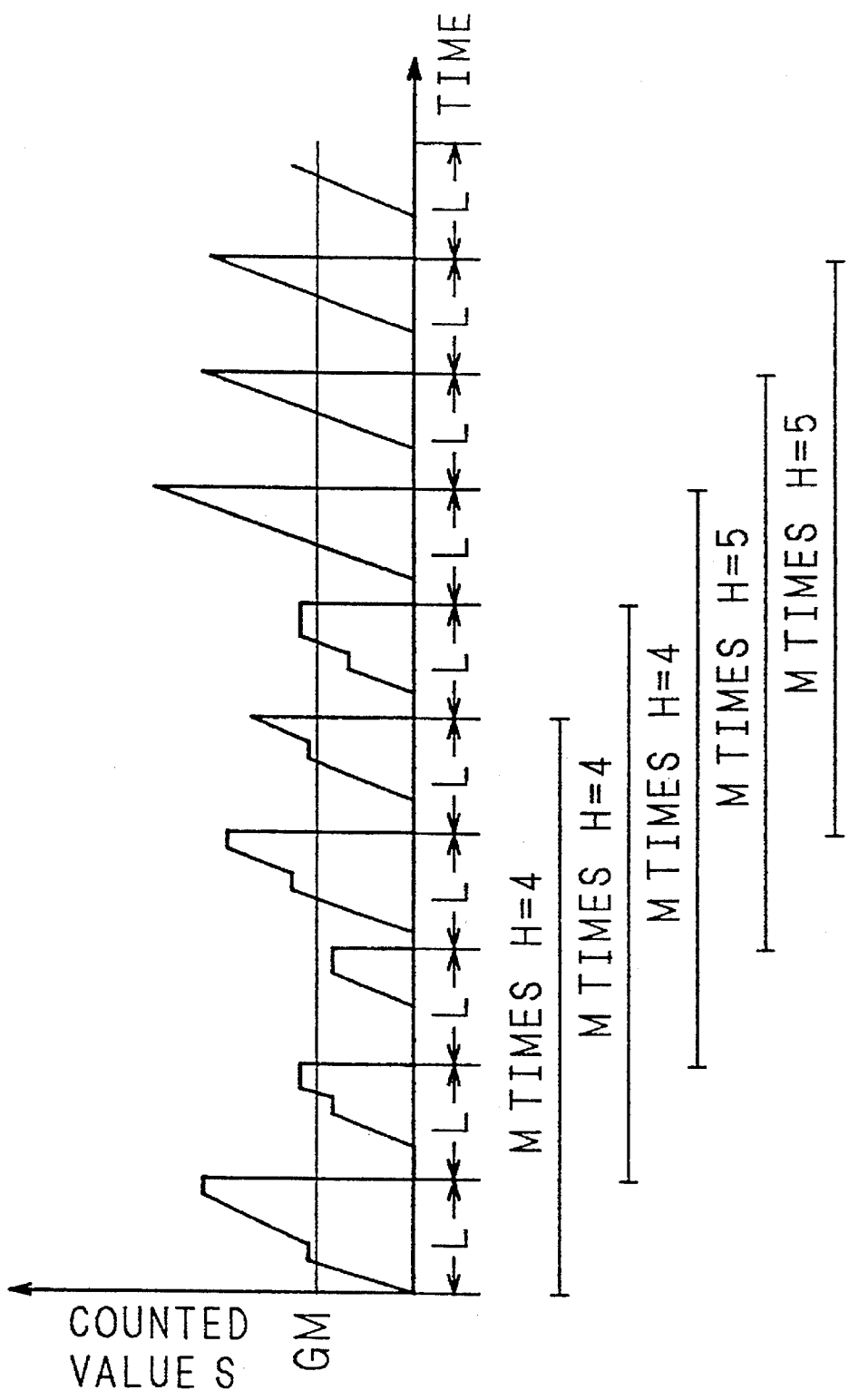
FIG. 7 is a diagram for explaining the variation of a level difference counted value when the video camera is not in a photographing state.
Figure 8:
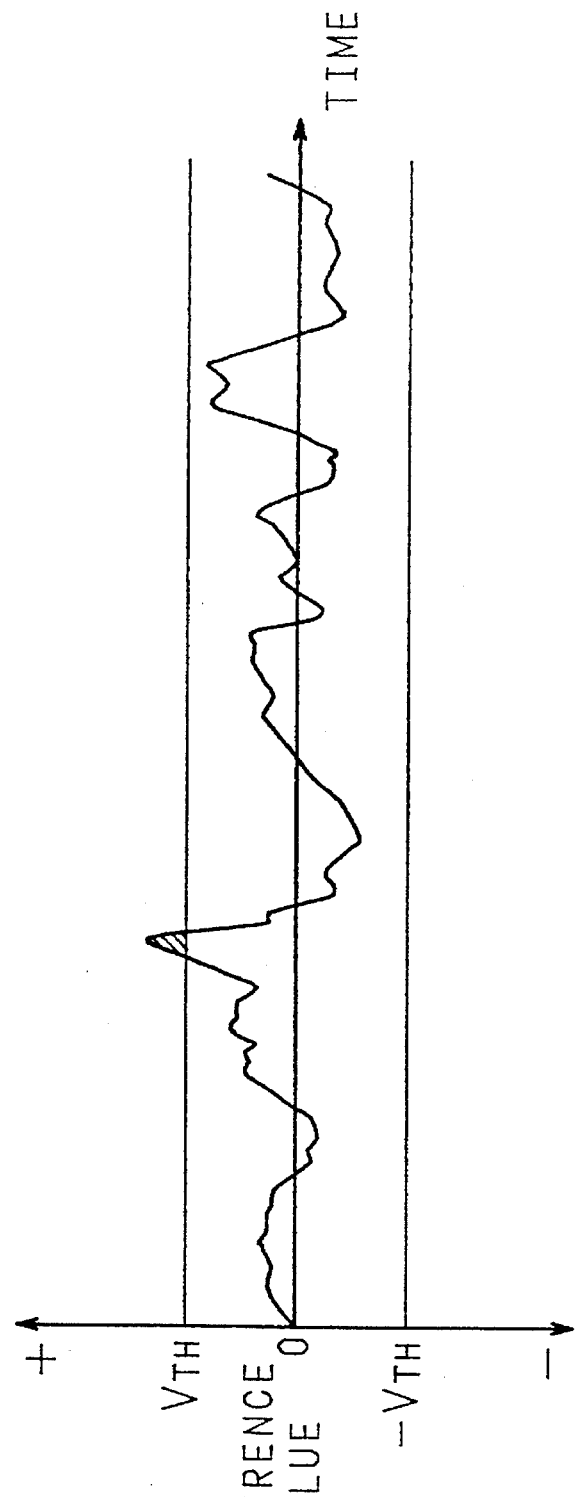
FIG. 8 is a diagram showing the waveform of an angular velocity signal when the video camera is in a photographing state.
Figure 9:
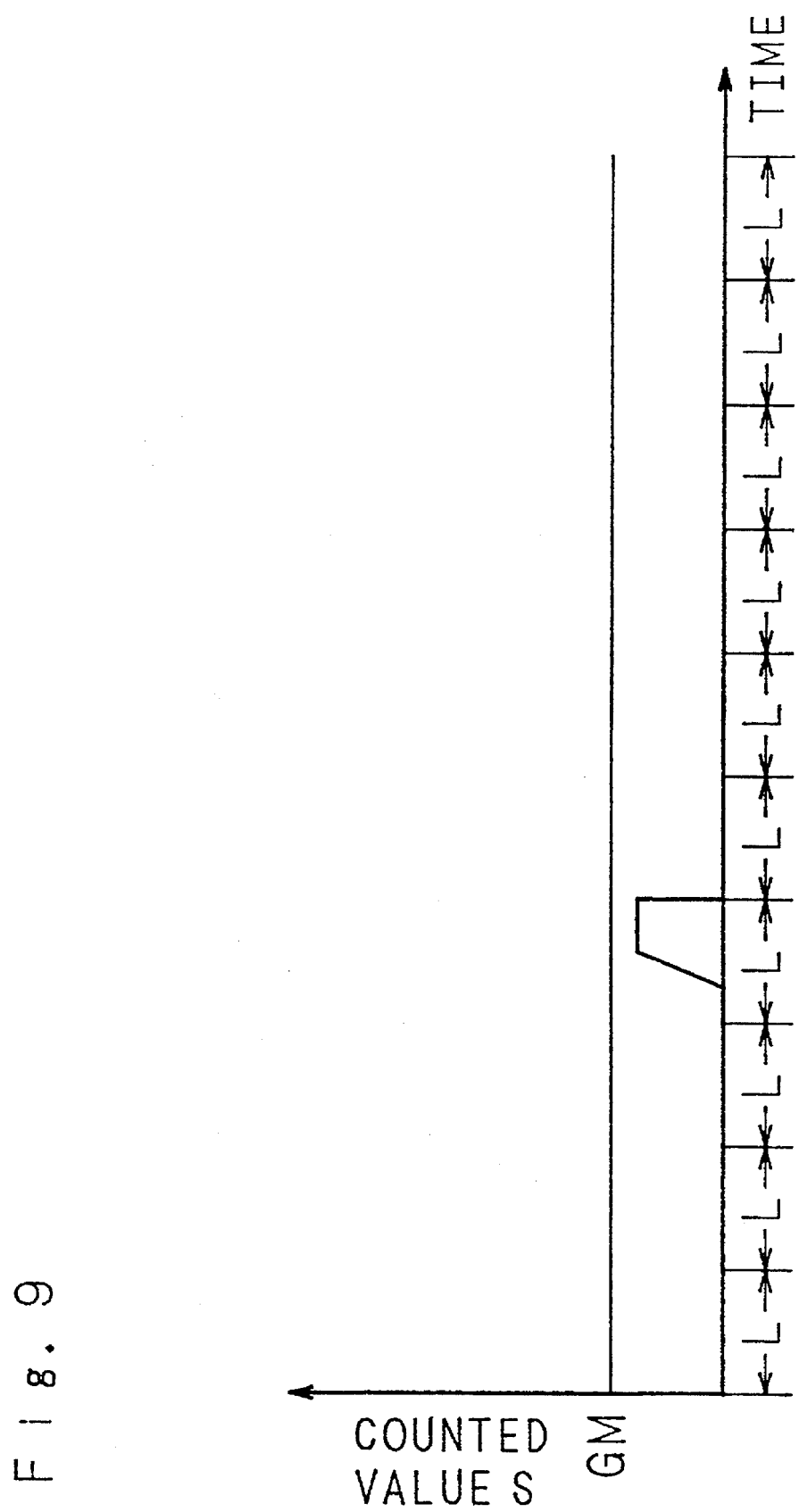
FIG. 9 is a diagram for explaining the variation of a level difference counted value when the video camera is in a photographing state.

For the past M times addresses $R_N$ at which the counted values S have been written, the number of addresses $R_N$ that are greater than a predetermined value GM is calculated to obtain an address number H (S7). Next, the address number H is compared with an integer T for size (S8); if the address number H is greater than the integer T, it is determined that the condition does not represent a photographing action (S9), and if the address number H is not greater than the integer T, then it is determined that the condition represents a photographing action (S10). More specifically, when the video camera is being carried around, the video camera is heavily swinging back and forth, causing the angular velocity signal to go beyond the threshold value $V_{TH}$ on both the positive and negative sides of the signal as shown in FIG. 6. Accordingly, the counted value obtained by counting the angular velocity signal where it exceeds the threshold value $V_{TH}$ varies as shown in FIG. 7 which plots the counted value for the angular velocity signal shown in FIG. 6. On the other hand, the swinging motion of the video camera in a photographing state is smaller than that caused by a carrying action, so that the angular velocity signal stays inside of the threshold value $V_{TH}$ most of the time, as shown in FIG. 8. Accordingly, the counted value obtained by counting the angular velocity signal where it exceeds the threshold value $V_{TH}$ varies as shown in FIG. 9 which plots the counted value for the angular velocity signal shown in FIG. 8. Therefore, whether the video camera is in a photographing state or not can be accurately determined by counting the number of times that the counted value S for the angular velocity signal exceeding the threshold value $V_{TH}$ in a predetermined time has exceeded the predetermined value GM.

Next, we will explain how the constants, i.e., the threshold value $V_{TH}$, the number of times, L, the number, M, of past data items written in the memory, the predetermined value GM, and the integer T, are selected. Since the angular velocity signal during a photographing action is smaller than the angular velocity signal being output when the video camera is being carried around (see FIG. 8), the threshold value $V_{TH}$ is selected so that most of the angular velocity signal during a photographing action stays inside of the threshold value $V_{TH}$. On the other hand, when the video camera is being carried around, the swinging of the video camera is mostly caused by the walking action of the operator; therefore, it is effective if the number of times, L, i.e. the time in which the angular velocity signal is counted, is selected equal to ½ of the swinging cycle of walking. As for the number, M, of past data items, a larger number would reduce the possibility of misjudgement, but would in turn require a longer time to judge whether the condition represents a photographing action or not. Therefore, when $$\text{Sampling time} \times \text{number of counts } L = 1 \text{ second} \quad (1)$$

the number, M, of past data items is selected experimentally as $$\text{Data number M=5 to 10} \quad (2)$$

The predetermined value GM and the integer T are determined experimentally, since the counted value S is greatly influenced by the gain of the amplifier 2 and the weight of the video camera. For example, when the sensitivity of the angular velocity sensor is 0.8 mv·DEG/sec., the gain of the amplifier 2 is ×120, the weight of the video camera is 600 g, and the sampling rate per second is 480, then the predetermined value GM=100 to 200 and the integer T=2 to 3 would be appropriate.

The microcomputer 3 thus judges whether the video camera is in a photographing state or not, and supplies the signal representing the result of the judgement to the system microcomputer 4. When the signal given from the microcomputer 3 indicates that the video camera is operating in a record mode but is not in a photographing state, the system microcomputer 4 controls the power supply circuit 11 to cut off the power of the video camera to stop the recording operation. Thus, when the video camera is carried around while being left in a record mode, the recording operation automatically stops to prevent misrecording.

Figure 11:
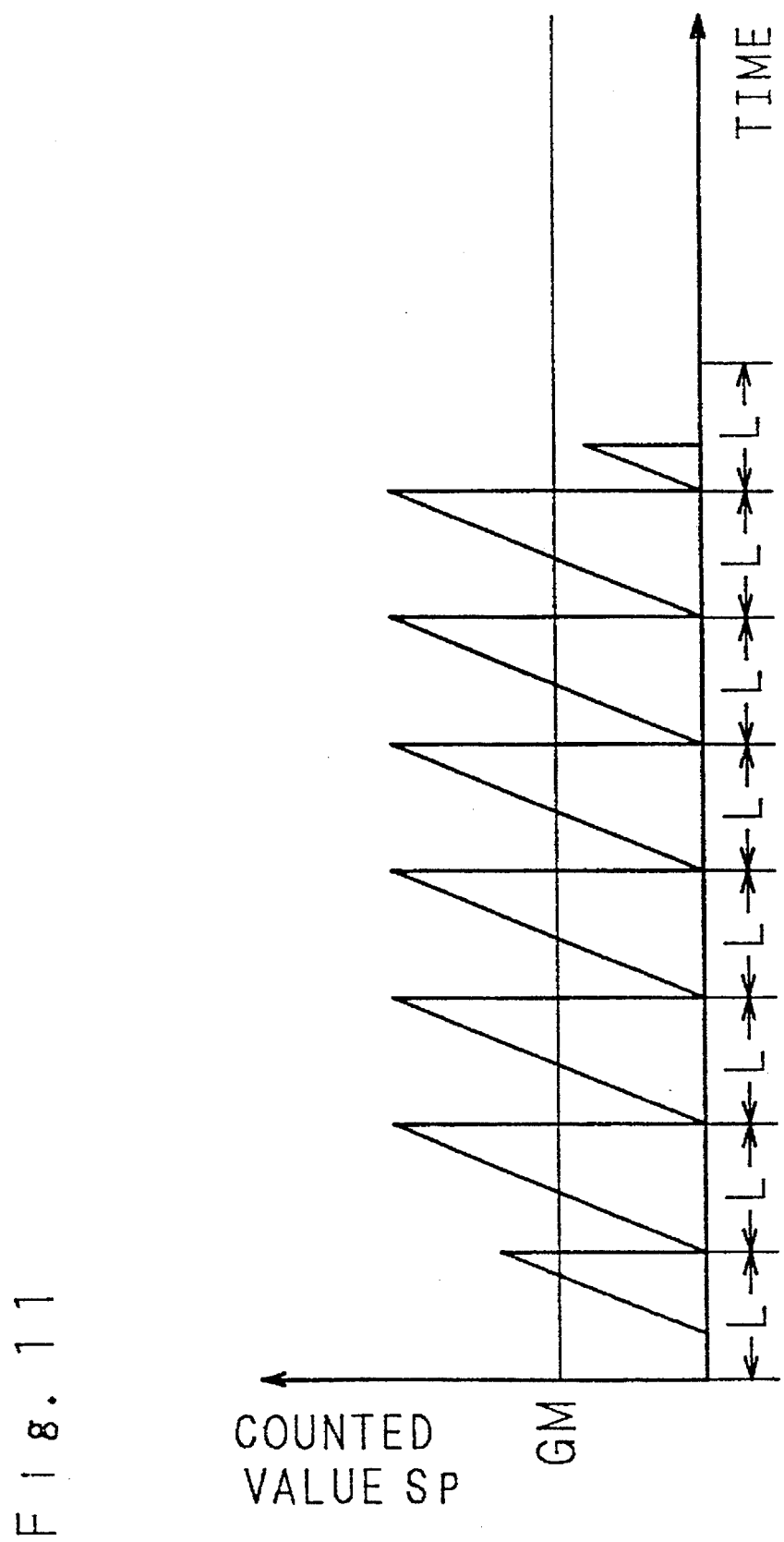
FIG. 11 is a diagram for explaining the variation of a counted value of positive level difference for the angular velocity signal when the video camera is in a tilting photographing state.
Figure 12:
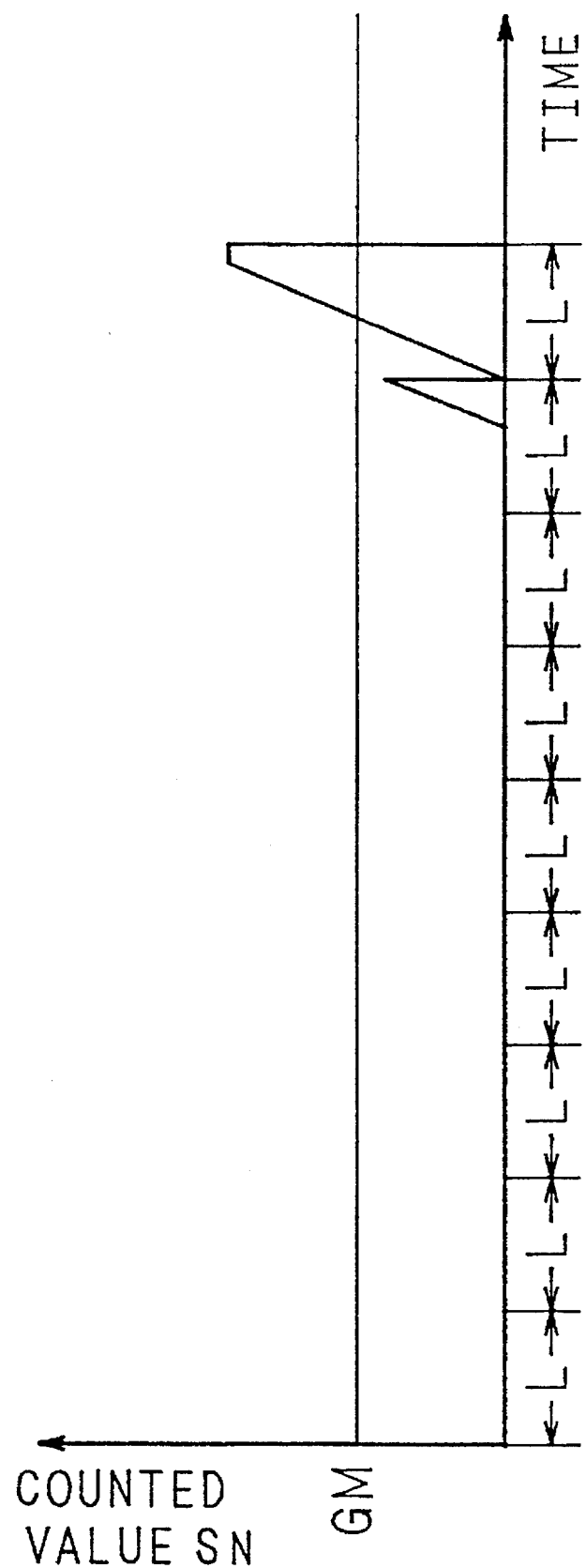
FIG. 12 is a diagram for explaining the variation of a counted value of negative level difference for the angular velocity signal when the video camera is in a tilting photographing state.

In the above-described procedure, the absolute value of the amplitude of the angular velocity signal, that is, the angular velocity signal that gives an input value equal to or greater than the threshold value $V_{TH}$, has been counted. However, when photographing a scene with the video camera being continuously tilted upward (tilting photographing), the angular velocity signal varies as shown in FIG. 10;

therefore, with the above-described method of counting, it is difficult to distinguish the swinging motion of the video camera during a tilting photographing action from that of the video camera during a carrying action on the basis of the counted value of the angular velocity signal. That is, the angular velocity signal during a tilting photographing action stays above the threshold value $V_{TH}$, as shown in FIG. 10, until the photographing action is completed. As a result, the counted values S taken at the sampling rate L for the angular velocity signal exceeding the threshold value $V_{TH}$ exceed the predetermined value GM on the positive side of the signal, as shown in FIGS. 11 and 12 that are given in contrast with FIG. 10, thus making the tilting action indistinguishable from the carrying action.

Figure 13:
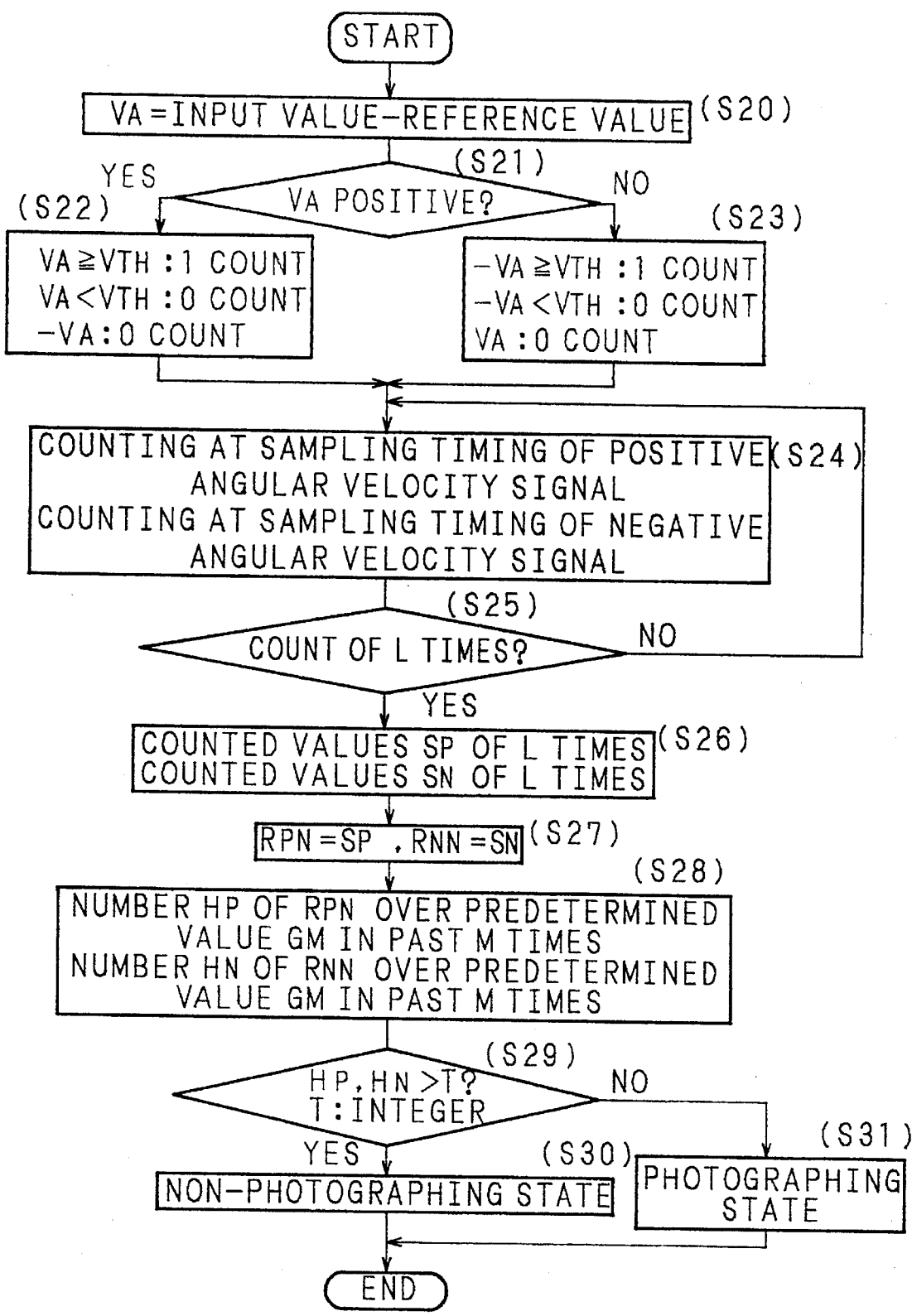
FIG. 13 is a flowchart showing another control procedure for the microcomputer shown in FIG. 4.

Therefore, in the case of a tilting photographing action, the microcomputer 3 performs mathematical operations on the input angular velocity signal in accordance with the flowchart of FIG. 13, which shows another control procedure for the microcomputer 3, to determine whether the currently input angular velocity signal is one that has been generated from a photographing action.

Figure 10:
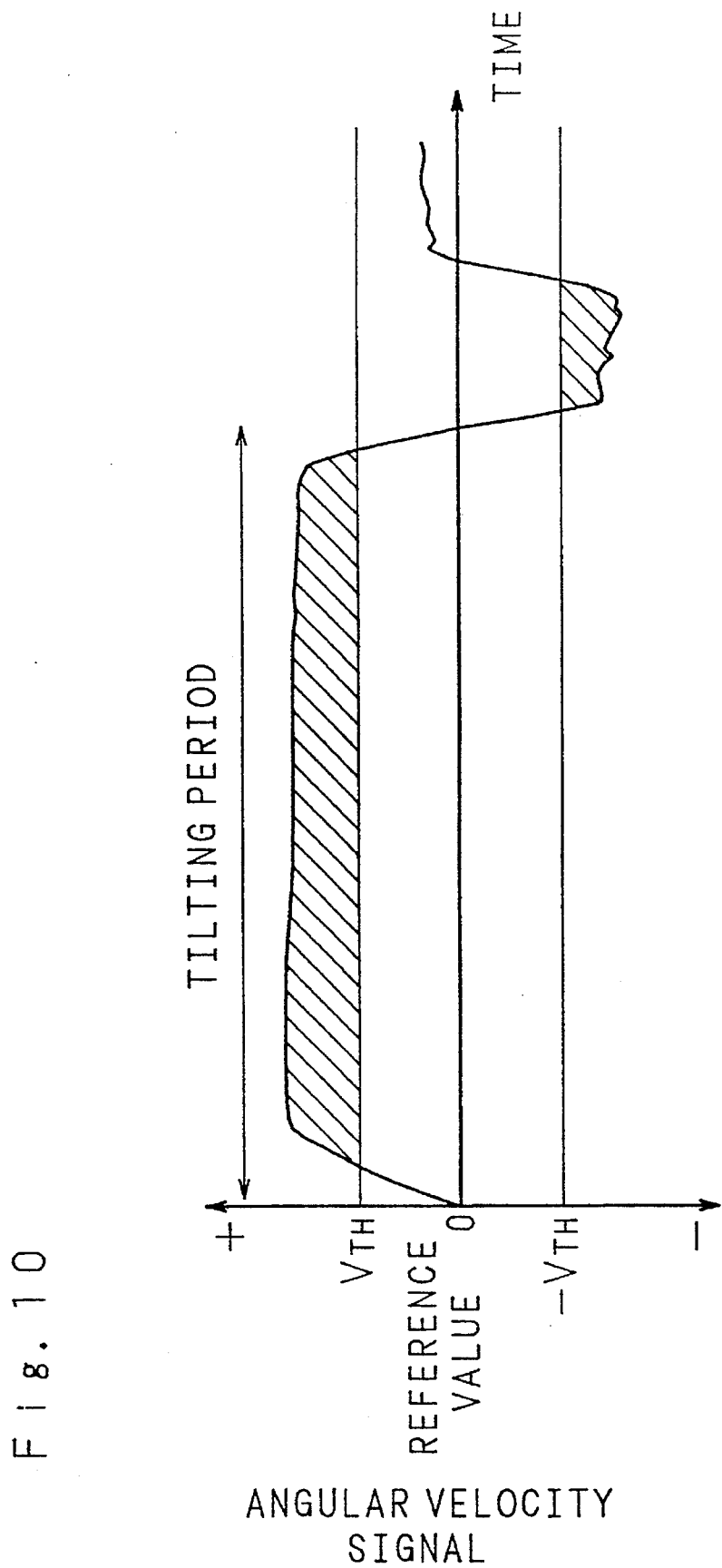
FIG. 10 is a diagram showing the waveform of an angular velocity signal when the video camera is in a tilting photographing state.

When an angular velocity signal, such as shown in FIG. 10, is generated from a tilting photographing action and is input to the microcomputer 3, the microcomputer 3 calculates a level difference $V_A$ between the input value and the reference value (S20). It is then determined whether the calculated level difference $V_A$ is for the angular velocity signal on the positive side or the angular velocity signal on the negative side (S21). When the level difference $V_A$ is for the positive side signal, if the level difference $V_A$ is equal to or greater than the threshold value $V_{TH}$, "1" is counted, and if it is smaller than the threshold value $V_{TH}$, "0" is counted, while for the level difference $-V_A$ for the angular velocity signal on the negative side, "0" is counted (S22). On the other hand, when the level difference is determined as $-V_A$ which is for the angular velocity signal on the negative side, if the level difference $-V_A$ is equal to or greater than the threshold value $V_{TH}$, "1" is counted, and if it is smaller than the threshold value $V_{TH}$, "0" is counted, while for the level difference $V_A$ for the angular velocity signal on the positive side, "0" is counted (S23). The "1" and "0" are counted at the sampling timing of the angular velocity signal on the positive side and of the angular velocity signal on the negative side (S24). It is then determined whether the number of times has reached a predetermined number of times, L, in a predetermined time (S25), and when the number or counts is reached L times, a counted value $S_P$ is obtained for the L times of the angular velocity signal on the positive side, and a counted value $S_N$ obtained for the L times of the angular velocity signal on the negative side (S26). Each time the number of times reaches L, the counted values $S_P$ and $S_N$ are fed to a memory (not shown) in the microcomputer 3, and each counted value $S_P$ is written at a different designated address $R_{PN}$ and each counted value $S_N$ written at a different designated address $R_{NN}$ in the memory (S27).

For the past M times addresses $R_{PN}$, $R_{NN}$ at which the counted values $S_P$, $S_N$ have been written, the numbers of addresses $R_{PN}$, $R_{NN}$ that are greater than the predetermined value GM are calculated to obtain address numbers $H_P$ and $H_N$, respectively (S28). Next, the address numbers $H_P$ and $H_N$ are respectively compared with the integer T for size (S29); if both of the address numbers $H_P$ and $H_N$ are greater than the integer T, it is determined that the condition does not represent a photographing action (S30), and if one or other of the address numbers $H_P$ and $H_N$ is not greater than the integer T, then it is determined that the condition represents a tilting photographing action (S31). More specifically, when the video camera is being carried around, the video camera is swinging repeatedly in both pitching directions, whereas during a tilting photographing action, the video camera is moved in one pitching direction only; based on this, it is judged whether the video camera is just being carried around or being operated in a tilting photographing state. The microcomputer 3 thus judges whether the video camera is in a tilting photographing state or not, and supplies the signal representing the result of the judgement to the system microcomputer 4. As previously described, when the signal given from the microcomputer 3 indicates that the video camera is operating in a record mode but is not in a tilting photographing state, the system microcomputer 4 controls the power supply circuit 11 to cut off the power of the video camera to stop the recording operation, thus preventing misrecording.

When counting the angular velocity signal from the angular velocity sensor in the manner described above, the angular velocity signal at zero angular velocity is taken as the reference value. However, the voltage of the angular velocity signal is not always constant because of variations of circuit elements, etc.

Figure 14:
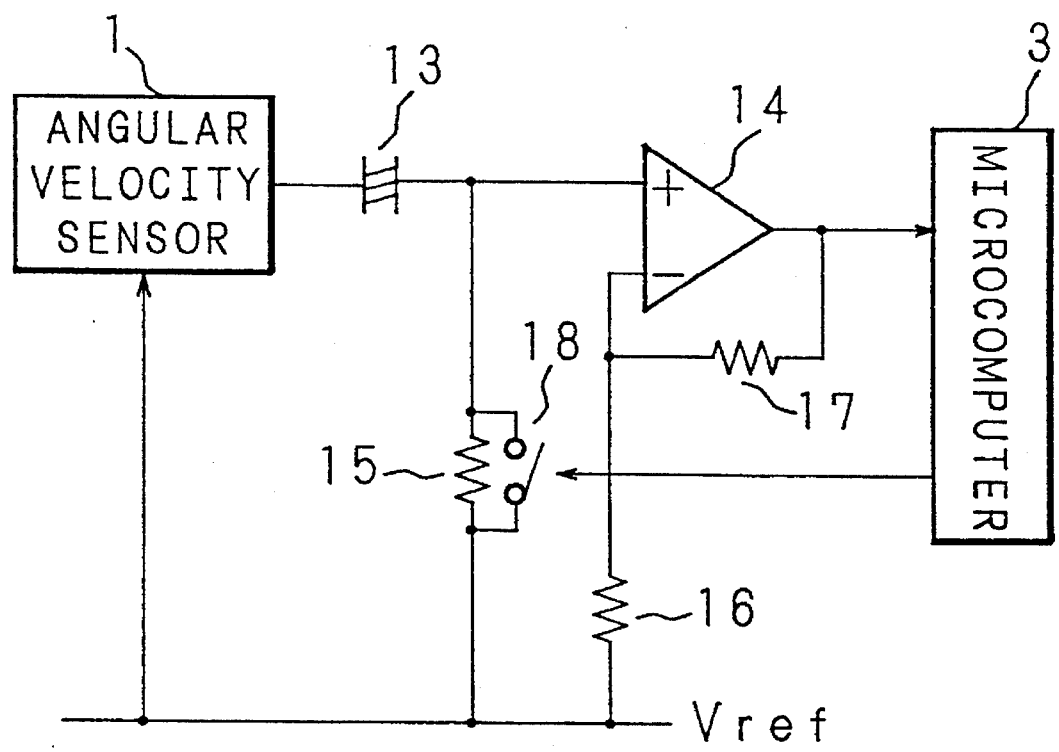
FIG. 14 is a block diagram of a circuit for compensating for variation in the angular velocity signal due to circuit elements.

FIG. 14 is a block diagram of a circuit for compensating for voltage variations of the angular velocity signal. A reference voltage $V_{ref}$ is given to the angular velocity sensor 1. The angular velocity signal output from the angular velocity sensor 1 is applied via a coupling capacitor 13 to a non-inverting input terminal + of an operational amplifier 14. The reference voltage $V_{ref}$ is also applied via a biasing resistor 15 to the non-inverting input terminal + of the operational amplifier 14. The reference voltage $V_{ref}$ is applied to an inverting input terminal − of an operational amplifier 14 via a resistor 16 as well as to the output terminal of the operational amplifier 14 via a series circuit of resistors 16 and 17. An output signal from the operational amplifier 14 is fed to the microcomputer 3. A control signal from the microcomputer 3 is given to an analog switch 18 which is connected in parallel with the biasing resistor 15 and which is opened and closed by the control signal.

The output signal from the angular velocity sensor 1 is amplified by the amplification ratio determined by the resistors 16 and 17. When the angular velocity is zero, the output voltage of the operational amplifier 14 becomes equal to the reference voltage $V_{ref}$ in an ideal condition. In reality, however, the output voltage deviates from the reference voltage $V_{ref}$ because of the bias current, offset voltage, etc. of the operational amplifier 14. If the analog switch 18 is turned on and kept on for a few seconds after power on, the non-inverting input terminal + of the operational amplifier 14 is held at the reference voltage $V_{ref}$, so that the operational amplifier 14 outputs a signal containing the error caused by the offset voltage of the operational amplifier at zero angular velocity, which signal is then input to the microcomputer 3. The microcomputer 3 performs operations using the input signal voltage as the reference voltage, to obtain an angular velocity signal corrected for variations of circuit elements.

Figure 15:
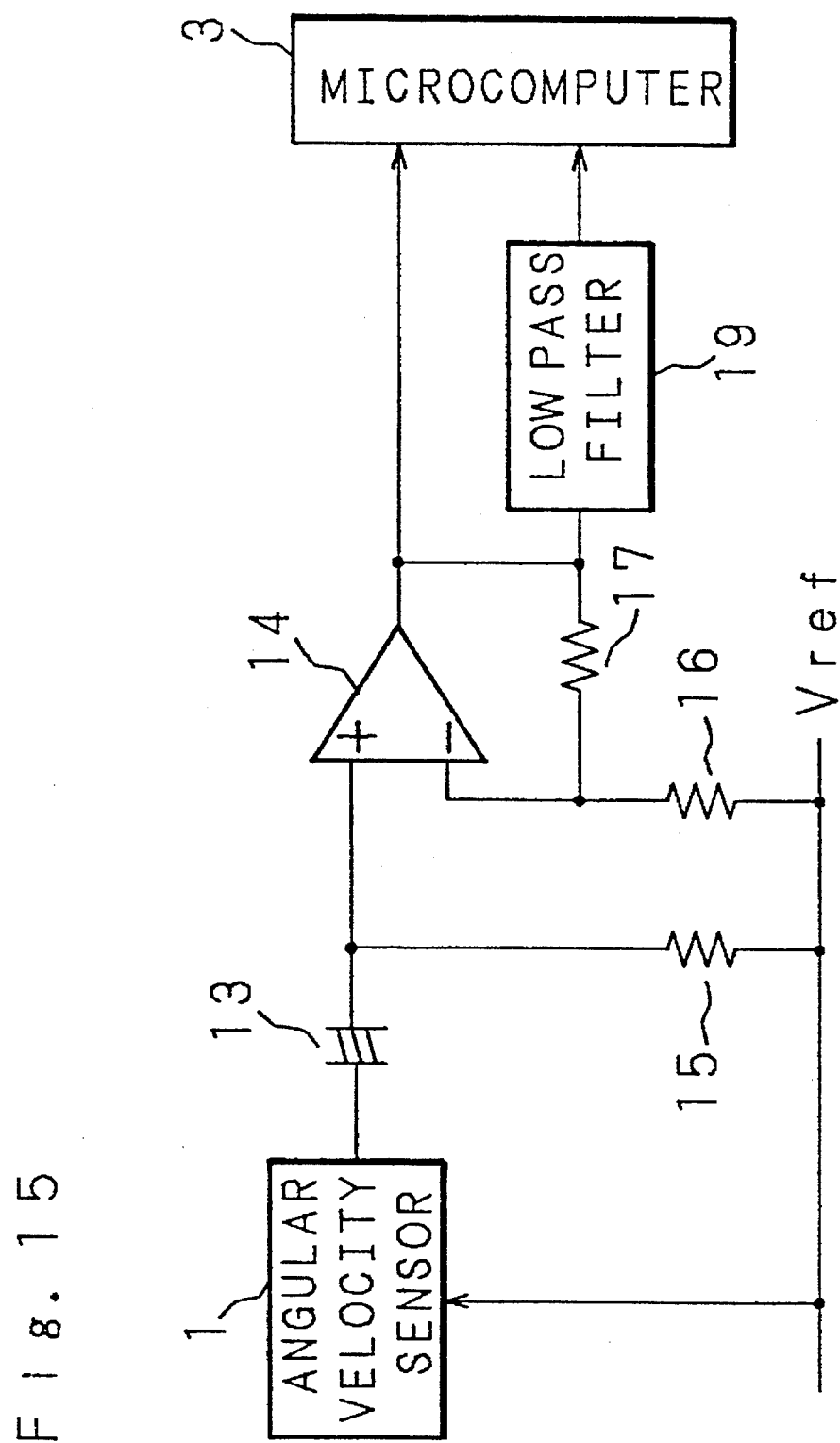
FIG. 15 is a block diagram of a circuit for compensating for variation in the angular velocity signal due to circuit elements.

Variations of the angular velocity signal due to circuit elements can also be corrected using the circuit shown in FIG. 15. In the circuit shown, the output signal of the operational amplifier 14 is fed to the microcomputer 3 via a low pass filter 19; otherwise, the circuit configuration is identical to that of the circuit shown in FIG. 14, and the same component parts as those shown in FIG. 14 are designated by the same reference numerals. The output signal from the operational amplifier 14 branches into two lines, one directly coupled to the microcomputer 3 and the other coupled to the microcomputer 3 via the low pass filter 19. The cutoff frequency of the low pass filter is selected not to pass the frequency components of the swinging motion associated with a walking action. The microcomputer 3 performs operations using the signal passed through the low pass filter 19 as the reference value, to obtain an angular velocity signal corrected for voltage variations due to circuit elements.

The video camera may be carried in a bag or a carrying case, or on a shoulder strap. In such cases, unlike cases where the video camera is carried with its grip held by hand, the swinging directions of the video camera cannot be determined. Therefore, an angular velocity sensor for detecting swinging movements in pitching directions and an angular velocity sensor for detecting swinging movements in yawing directions are incorporated in the video camera in order to distinguish the carrying action from the photographing action.

Figure 16:
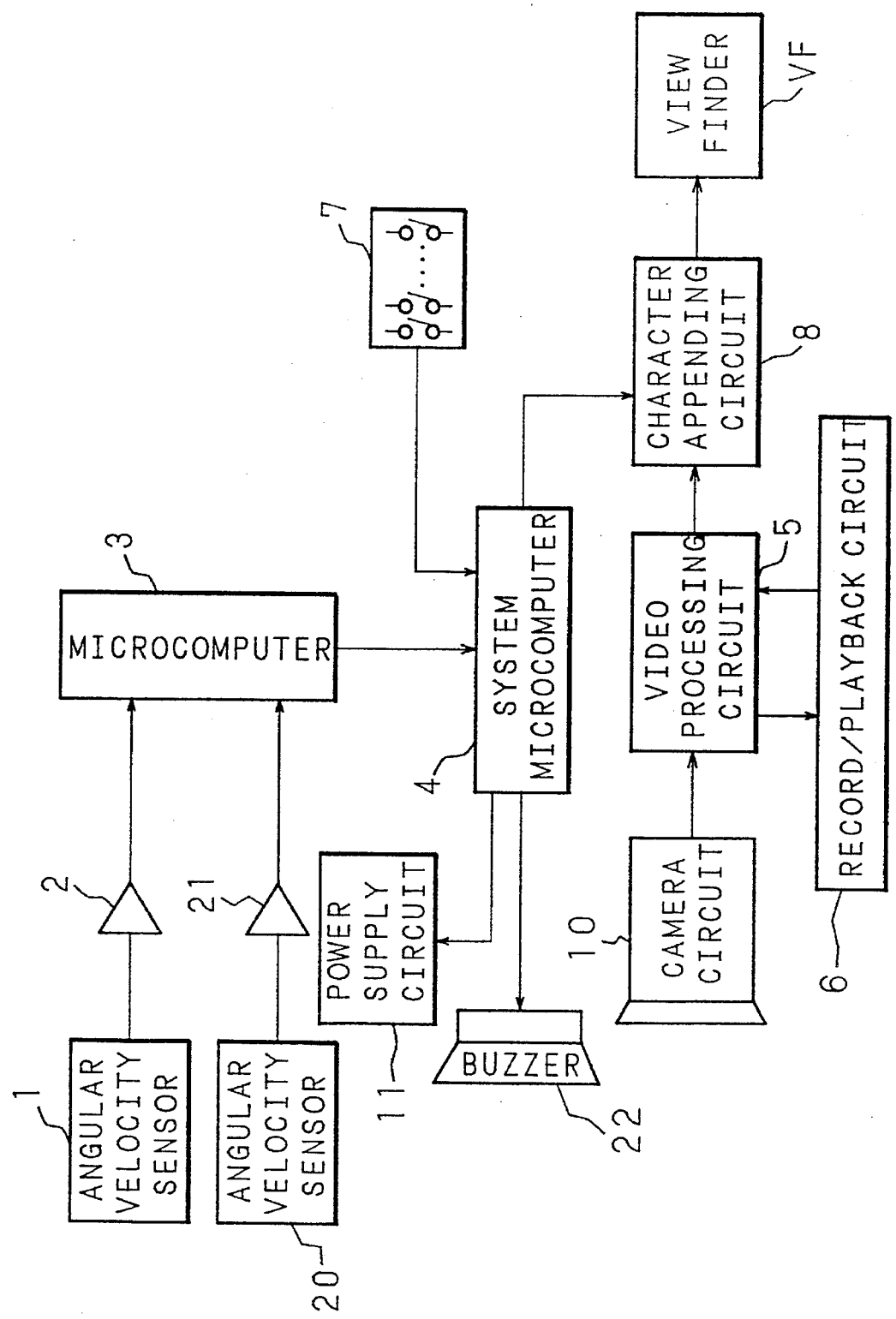
FIG. 16 is a block diagram showing an essential configuration of another embodiment of the video camera according to the invention.

FIG. 16 is a block diagram showing an essential configuration of the video camera incorporating the two angular velocity sensors. An output signal from the angular velocity sensor 1 for detecting swinging movements of the video camera in pitching directions is input to the microcomputer 3 via the amplifier 2, while an output signal from the angular velocity sensor 20 for detecting swinging movements of the video camera in yawing directions is input to the microcomputer 3 via an amplifier 21. A signal from the system microcomputer 4 is given to a buzzer 22 that is used to alert the operator during a photographing action. Otherwise, the configuration of the video camera is identical to that of the video camera shown in FIG. 4, and the same component parts as shown in FIG. 4 are designated by the same reference numerals.

Figure 17B:
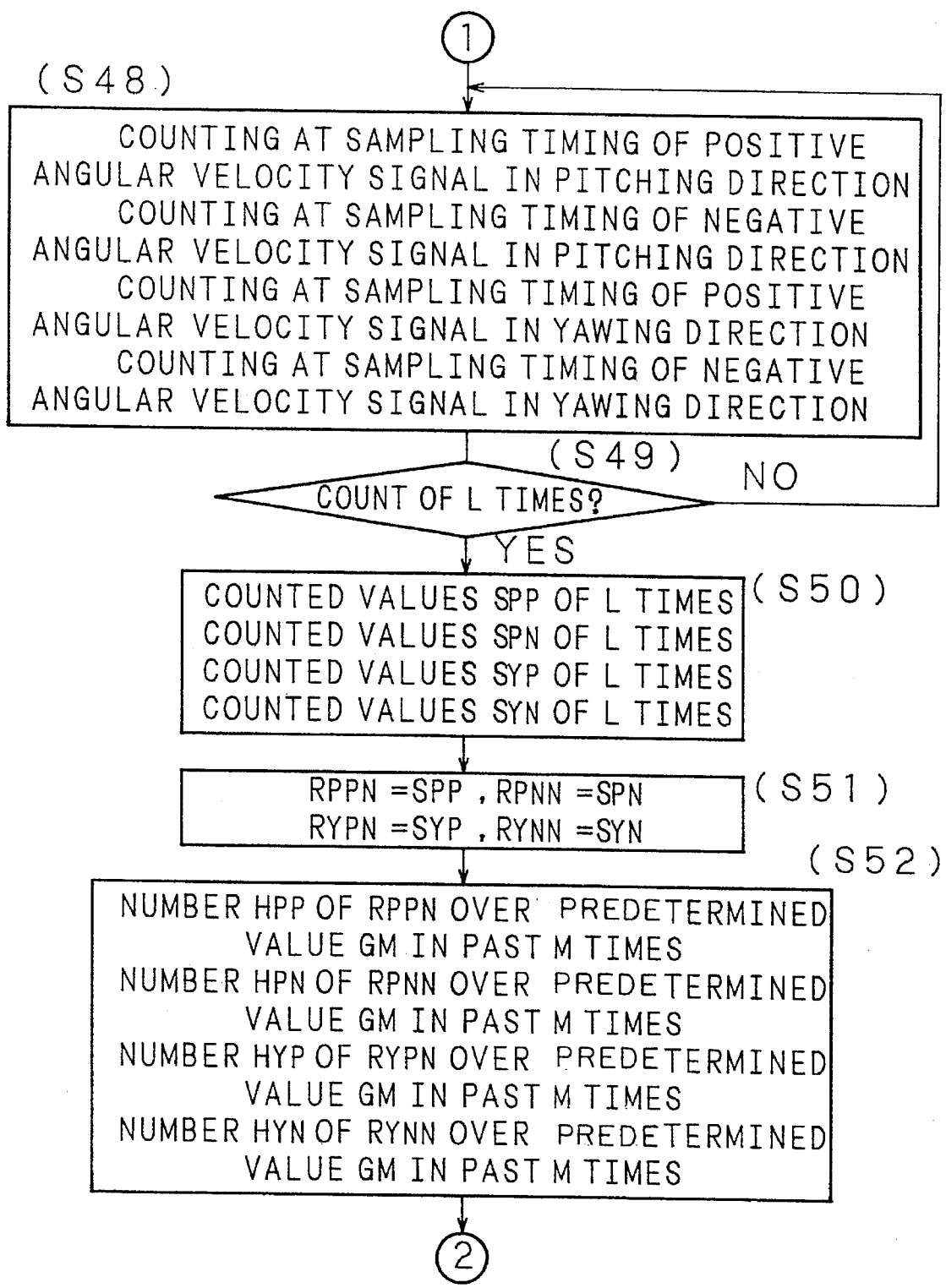
FIG. 17(b) is part of a flowchart showing a control procedure for a microcomputer shown in FIG. 16.
Figure 18:
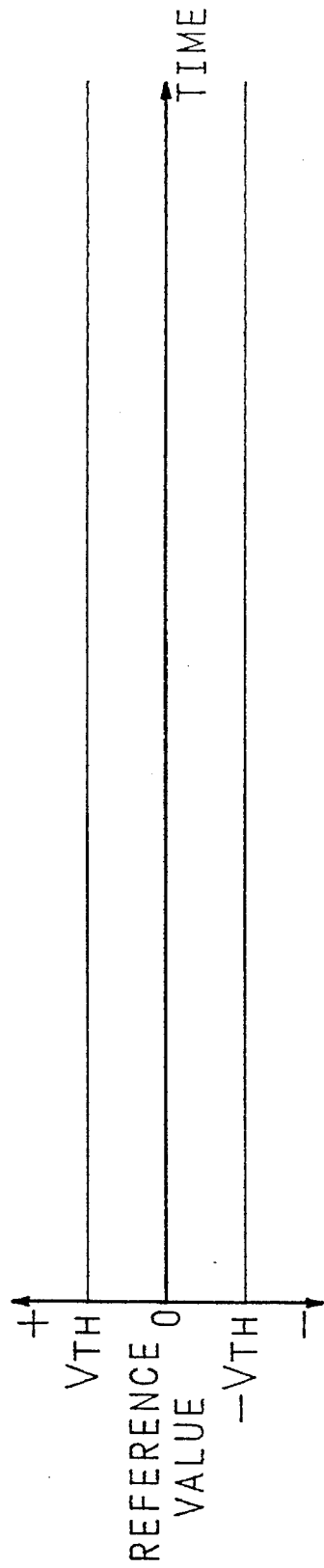
FIG. 18 is a diagram showing the waveform of an angular velocity signal output from an angular velocity sensor in pitching directions.
Figure 19:
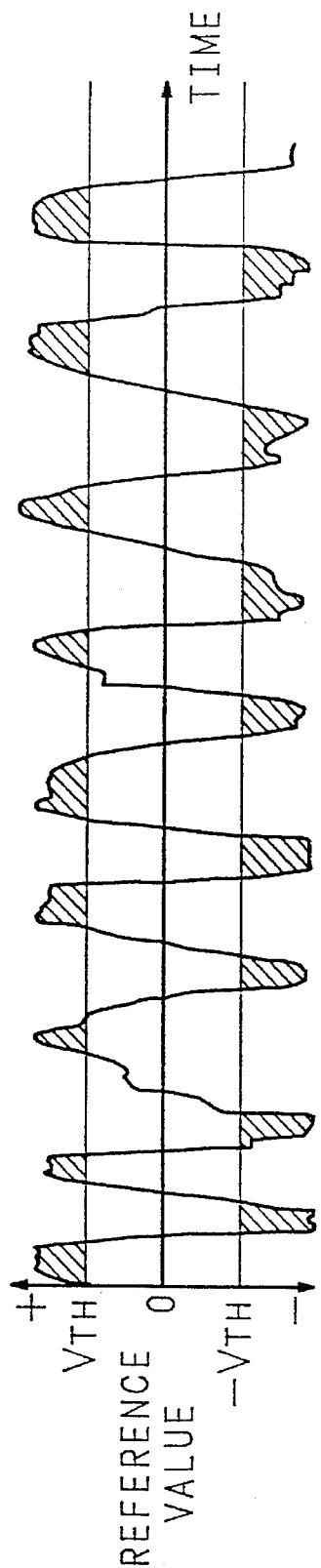
FIG. 19 is a diagram showing the waveform of an angular velocity signal output from an angular velocity sensor in yawing directions.

Next, the operation of the video camera of the above configuration will be described below with reference to the flowcharts shown in FIGS. 17(a), (b) and (c). Suppose that an angular velocity signal, such as shown in FIG. 18, representing movements in pitching directions, is supplied to the microcomputer 3 from the angular velocity sensor 1, and an angular velocity signal, such as shown in FIG. 19, representing movements in yawing directions, is supplied to the microcomputer 3 from the angular velocity sensor 20. Then, the microcomputer 3 calculates a level difference $V_{PA}$ between the reference value and the input value of the angular velocity signal in pitching directions, and a level difference $V_{YA}$ between the reference value and the input value of the angular velocity signal in yawing directions (S40). Next, it is determined whether the level difference $V_{PA}$ is for the angular velocity signal on the positive side or on the negative side (S41). If it is determined that the level difference $V_{PA}$ is for the positive side signal, then it is determined whether the level difference $V_{YA}$ is for the positive side or the negative side angular velocity signal (S42).

If it is determined that the level difference $V_{YA}$ is for the positive side signal, then "1" is counted if the level difference $V_{PA}$ is equal to or greater than the threshold value $V_{TH}$, and "0" is counted if it is smaller than the threshold value $V_{TH}$. Also, if the level difference $V_{YA}$ is equal to or greater than the threshold value $V_{TH}$, "1" is counted, and if it is smaller than the threshold value $V_{TH}$, "0" is counted. Further, for the level difference $V_{PBN}$ for the negative side angular velocity signal in pitching directions and for the level difference $V_{YBN}$ for the negative side angular velocity signal in yawing directions, "0" is counted (S43).

On the other hand, if it is determined that the level difference $V_{YA}$ is for the negative side angular velocity signal, then "1" is counted if the level difference $V_{PA}$ is equal to or greater than the threshold value $V_{TH}$, and "0" is counted if it is smaller than the threshold value $V_{TH}$. Also, if the level difference $-V_{YA}$ for the negative side angular velocity signal is equal to or greater than the threshold value $V_{TH}$, "1" is counted, and if it is smaller than the threshold value $V_{TH}$, "0" is counted. Further, for the level difference $V_{PBN}$ for the negative side angular velocity signal in pitching directions and for the level difference $V_{BP}$ for the positive side angular velocity signal in yawing directions, "0" is counted (S44).

In step (S41), if it is determined that the level difference $V_{PA}$ is for the negative side angular velocity signal, then it is determined whether the level direction $V_{YA}$ in yawing directions is for the angular velocity signal on the positive side or on the negative side (S45). If it is determined that the level difference $V_{YA}$ is for the positive side signal, then "1" is counted if the level difference $-V_{PA}$ for the negative side angular velocity signal in pitching directions is equal to or greater than the threshold value $V_{TH}$, and "0" is counted if it is smaller than the threshold value $V_{TH}$. Also, if the level difference $V_{YA}$ in yawing directions is equal to or greater than the threshold value $V_{TH}$, "1" is counted, and if it is smaller than the threshold value $V_{TH}$, "0" is counted. Further, for the level difference $V_{PBP}$ for the positive side angular velocity signal in pitching directions and for the level difference $V_{YBN}$ on the negative side angular velocity signal in yawing directions, "0" is counted (S46).

On the other hand, if it is determined that the level difference $V_{YA}$ is for the negative side angular velocity signal, then "1" is counted if the level difference $-V_{PA}$ for the negative side angular velocity signal is equal to or greater than the threshold value $V_{TH}$, and "0" is counted if it is smaller than the threshold value $V_{TH}$. Also, if the level difference $-V_{YA}$ for the negative side angular velocity signal in yawing directions is equal to or greater than the threshold value $V_{TH}$, "1" is counted, and if it is smaller than the threshold value $V_{TH}$, "0" is counted. Further, for the level difference $V_{PBP}$ for the positive side angular velocity signal in pitching directions and for the level difference $V_{YBP}$ for the positive side angular velocity signal in yawing directions, "0" is counted (S47).

Figure 20:
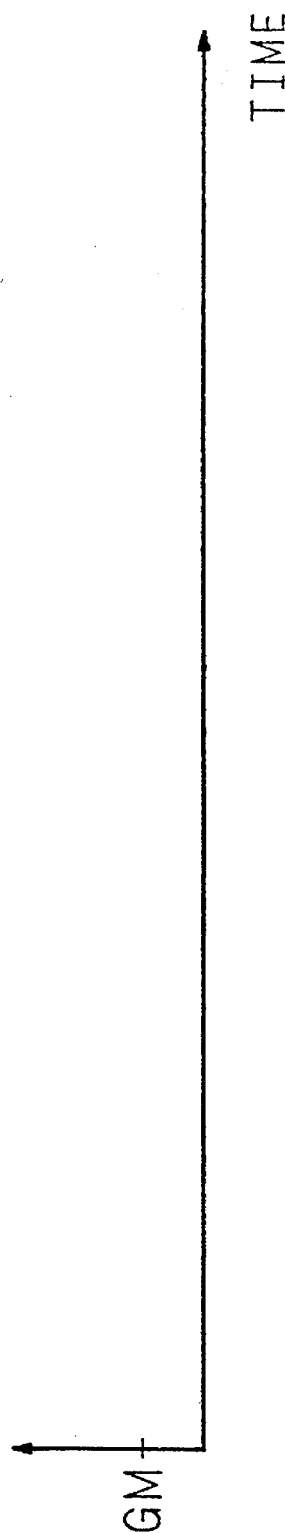
FIG. 20 is a diagram for explaining a counted value of positive level difference for the angular velocity signal in pitching directions.
Figure 21:
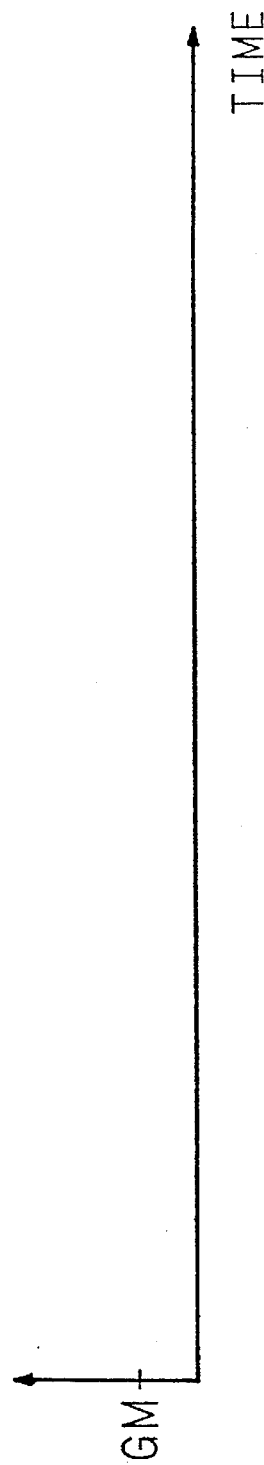
FIG. 21 is a diagram for explaining a counted value of negative level difference for the angular velocity signal in pitching directions.
Figure 22:
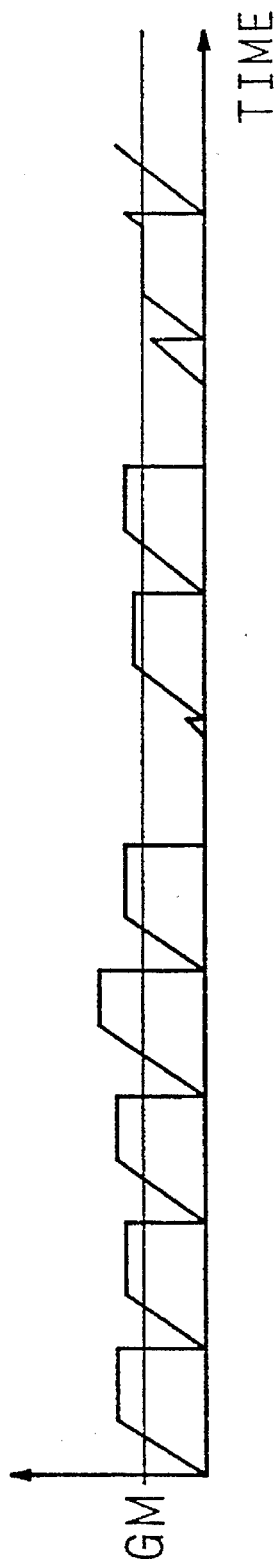
FIG. 22 is a diagram for explaining a counted value of positive level difference for the angular velocity signal in yawing directions.
Figure 23:
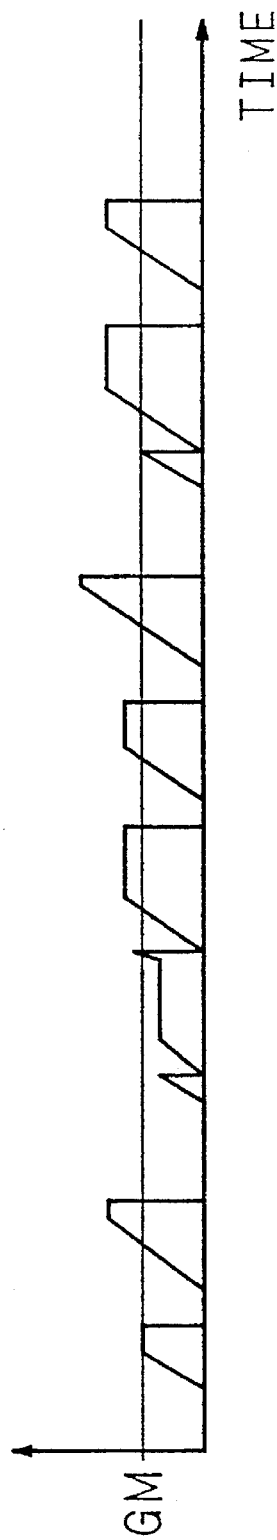
FIG. 23 is a diagram for explaining a counted value of negative level difference for the angular velocity signal in pitching directions.

The "1" and "0" are counted at the sampling timing of the angular velocity signal, to obtain a counted value $S_{PP}$ for the positive angular velocity signal in pitching directions, a counted value $S_{PN}$ for the negative angular velocity signal, a counted value $S_{YP}$ for the positive angular velocity signal in yawing directions, and a counted value $S_{YN}$ for the negative angular velocity signal (S48). Each time the number of counts reaches L (S49), the respective counted values for the L times are obtained (S50). The thus obtained counted values for the angular velocity signals are as shown in FIGS. 20 and 21, which are given in contrast with FIG. 18, for the angular velocity signal in pitching directions shown in FIG. 18, and as shown in FIGS. 22 and 23, which are given in contrast with FIG. 19, for the angular velocity signal in yawing directions shown in FIG. 19.

Each time the number of counts reaches L, the counted values $S_{PP}$, $S_{PN}$, $S_{YP}$, and $S_{YN}$ are given to a memory (not shown) in the microcomputer 3; the counted values $S_{PP}$, $S_{PN}$, $S_{YP}$, and $S_{YN}$ are written at respectively designated address $R_{PPN}$, $R_{PNN}$, $R_{YPN}$, and $R_{YNN}$ (S51). For the past M times addresses $R_{PPN}$, $R_{PNN}$, $R_{YPN}$, and $R_{YNN}$ at which the counted values have been written, the numbers of addresses that are greater than the predetermined value GM are calculated to obtain address numbers $H_{PP}$, $H_{PN}$, $H_{YP}$, and $H_{YN}$ (S52).

Next, the address numbers $H_{PP}$ and $H_{PN}$ are respectively compared with the integer T for size (S53). If both of the address numbers $H_{PP}$ and $H_{PN}$ in pitching directions are judged to be greater than the integer T, then it means that the video camera is swinging in both pitching directions, and therefore, it is determined that the condition represents movements associated with a carrying action, not a photographing action (S54). On the other hand, if one or other of the address numbers $H_{PP}$ and $H_{PN}$ is judged to be equal to or smaller than the integer T, the address numbers $H_{YP}$ and $H_{YN}$ in yawing directions are respectively compared with the integer T for size (S55). If both of the address numbers $H_{YP}$ and $H_{YN}$ are judged to be greater than the integer T, it means that the video camera is being repeatedly moved in yawing directions, and therefore, it is determined that the video camera is not in a photographing state (S54). On the other hand, if one or other of the address numbers $H_{YP}$ and $H_{YN}$ is judged to be equal to or smaller than the integer T, it means that the video camera is being moved in yawing directions but with no repetitiveness in the movement, and therefore, it is determined that the video camera is in a photographing state (S56).

When it is determined that the video camera is not in a photographing state whereas it is left in a record mode, the system microcomputer 4 cuts off power to stop the recording operation to prevent misrecording, as previously described. Also, when the video camera is in a recording operation, if a signal indicating that the video camera is not in a photographing state is given to the system microcomputer 4, the system microcomputer 4 issues a signal to activate the buzzer 22 to notify the operator of a faulty recording condition.

In the video camera of the above configuration, movements associated with a photographing action can be distinguished with certainly from other movements even in cases where the swinging directions of the video camera cannot be determined when it is being carried around. Therefore, a misrecording situation can be avoided without fail even if the video signal is carried around while being left in a record mode.

In a photographing action under heavily shaking conditions, for example, when photographing a scene from a vehicle running on a rough road, the video camera may be subjected to shaking of the magnitude equivalent to that of the movements encountered when it is being carried around. In such photographing conditions, it may be erroneously judged that the video camera is not in a photographing state even if it is in a photographing state. In such cases, if a signal is given from the microcomputer 3 indicating that the video camera is not in a photographing state, the system microcomputer 4 ignores such a signal for a predetermined time after operation of an operation key in the key array 7, illustrated in FIG. 16, and judges that the video camera is in a photographing state.

Figure 17C:
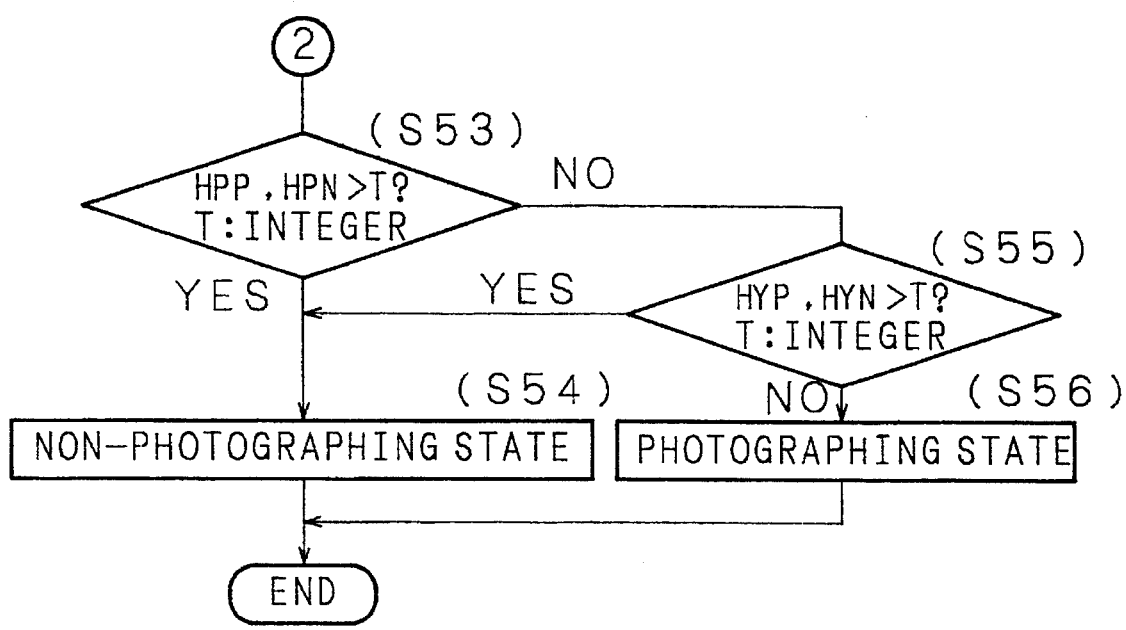
FIG. 17(c) is part of a flowchart showing a control procedure for a microcomputer shown in FIG. 16.

Also, there are situations where the operator continues photographing a scene while heavily shaking his video camera unconsciously. Such situations occur, for example, when the operator is photographing different objects in short intervals of time or photographing an object while walking. In such photographing situations, the recorded image will often become fragmented and jarred. To avoid such a problem, the video camera is constructed to notify the operator of a faulty photographing condition when the video camera is subjected to heavy shaking while photographing a scene. This is done by calculating an angular velocity signal in pitching directions and an angular velocity signal in yawing directions by the microcomputer 3. In this case, the threshold value $V_{TH}$ with which each angular velocity signal is compared is set smaller than the threshold value $V_{TH}$ used to distinguish the carrying movements. Control is performed in accordance with the flowchart of FIG. 17 in the same manner as previously described. For the past M times, if both of the address numbers $H_{PP}$ and $H_{PN}$, each representing the number of addresses greater than the predetermined value GM, are greater than the integer T (S53), it is judged that the photographing condition is bad. A signal representing the result of the judgement is input to the system microcomputer 4. When the video camera is in a record mode, if the result indicating a bad photographing condition is given from the microcomputer 3, then the system microcomputer 4 issues a signal to activate the buzzer 22 to notify the operator of the bad photographing condition. At the same time, the system microcomputer 4 issues a signal to the character appending circuit 8 to append a character or characters to the video signal so that a message indicating a faulty photographing condition is displayed on the image displayed in the viewfinder VF.

Apart from the previously described carrying condition of the video camera, when the video camera is carried around in a bag, the amount of the swinging movement of the video camera may be reduced because of the weight of the bag, etc. In such situations, it is difficult to distinguish a carrying action. However, because of the darkness in the bag, the average value of the video signal produced by the video camera is reduced. Therefore, when the average value of the video signal is small, it is judged that the video camera is carried in a bag or a carrying case, and therefore that the video camera is not in a photographing state. More specifically, when the average value of the video signal is smaller than a predetermined value, the threshold value used when counting the output signal of the angular velocity sensor is decreased so that even the slightest movement can be judged whether it is a movement resulting from a photographing action or not.

Figure 24:
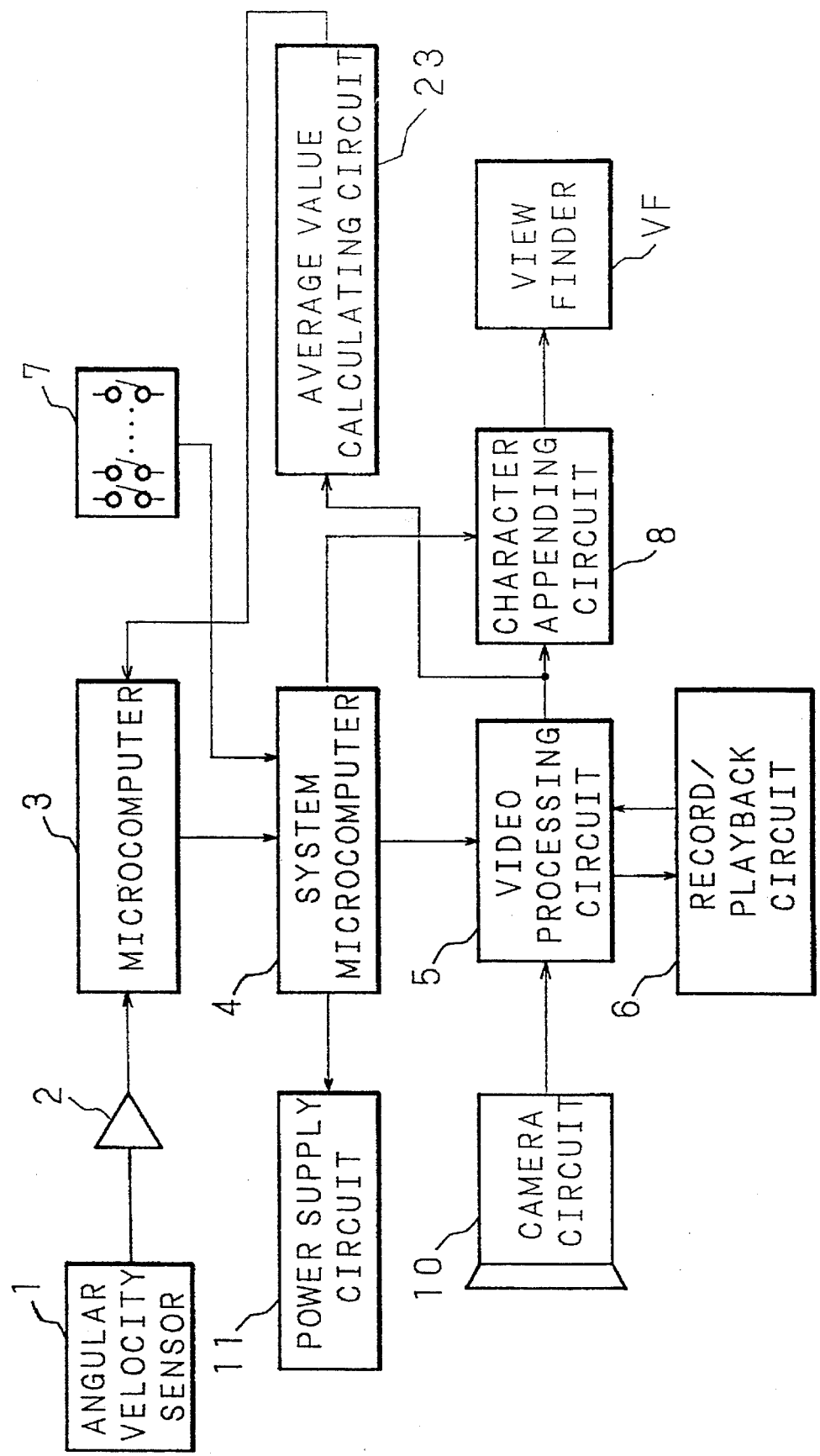
FIG. 24 is a block diagram showing an essential configuration of a further embodiment of the video camera according to the invention.

FIG. 24 is a block diagram showing an essential configuration of a video camera that is capable of making such distinction. The video signal output from the video processing circuit 5 is supplied to an average value calculating circuit 23 where the average value of the video signal is calculated. The average value calculating circuit 23 produces an average value signal which is input to the microcomputer 3. The configuration other than the average value calculating circuit 23 is identical to that of the video camera shown in FIG. 4, and the same component parts as those shown in FIG. 4 are designated by the same reference numerals.

When the average value of the video signal is low, the microcomputer 3 decreases the threshold value $V_{TH}$ with which the input value of the angular velocity signal is to be compared. Also, when the video camera is carried in a bag or the like, the swinging period of the video camera becomes long. Therefore, the number of times, L, for counting the level difference $V_A$ is increased to lengthen the unit time of counting. This enables the carrying condition to be judged on the basis of the video signal.

In situations where the operator photographs a scene while heavily shaking his video camera intentionally or where the operator photographs a scene from a vehicle running on a rough road, such situations may lead to the judgement that the video camera is not in a photographing state. To avoid such a problem, a delay time of predetermined length is provided from the time such judgement is made, until the power is cut off, and during the delay time period, a message is displayed to the effect that the power will be cut off to avoid misrecording. More specifically, when the system microcomputer 4 determines the condition as misrecording, a character signal indicating the misrecording condition is appended to the video signal supplied to the viewfinder VF from the character appending circuit 8. As a result, a misrecording message is displayed in the viewfinder VF to alert the operator. After such a message has been displayed for the predetermined length of time, the system microcomputer 4 controls the power supply circuit 11 to cut off the power. An LED may be built in the viewfinder VF to substitute for the misrecording message to alert the operator. When alerted, the operator can avoid getting the power cut off by performing a prescribed key operation, or by reducing the amount of the shaking motion and putting the video camera out of the erroneous recording condition, while the misrecording display is on.

Figure 25:
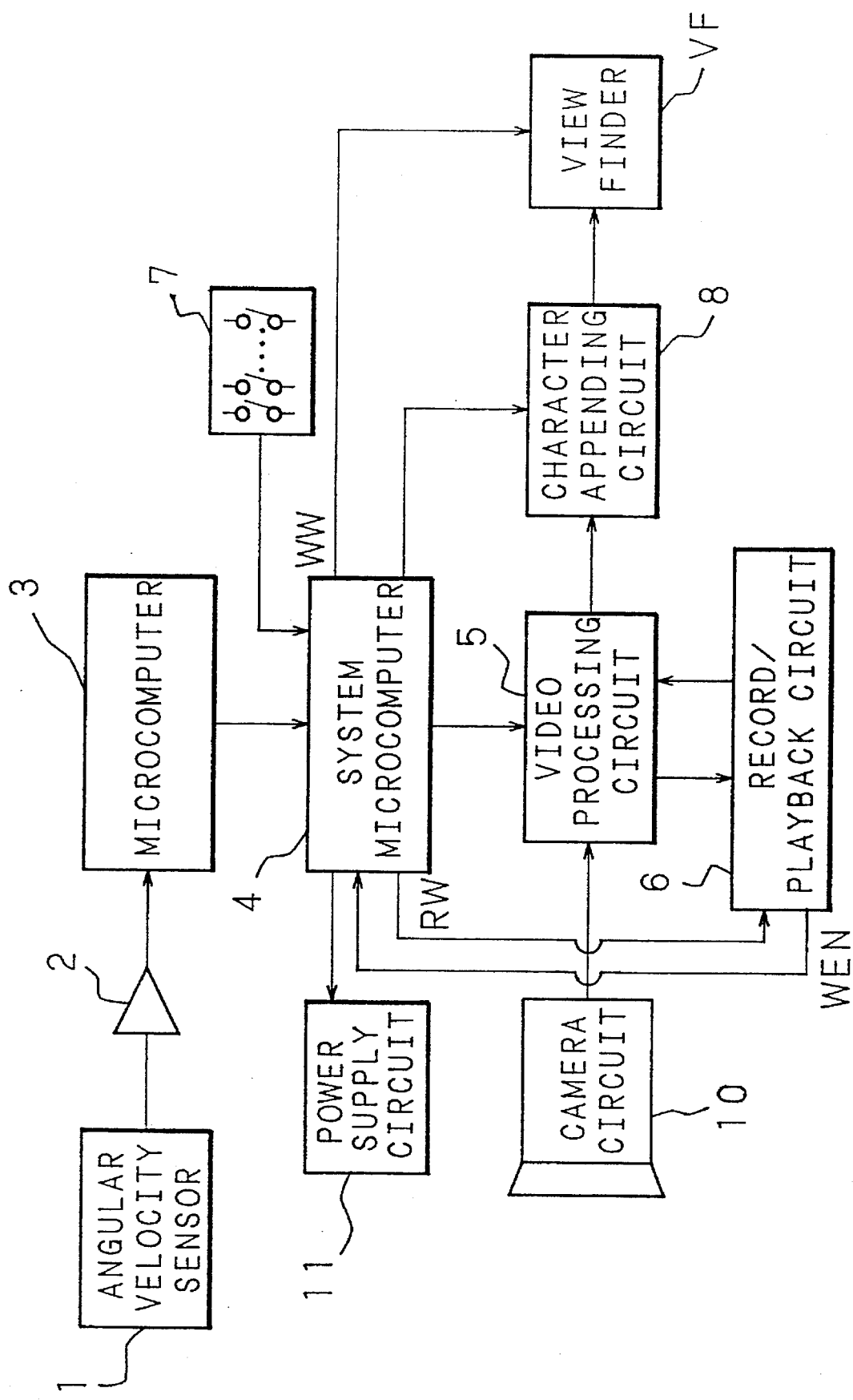
FIG. 25 is a block diagram showing an essential configuration of a still further embodiment of the video camera according to the invention.

FIG. 25 is a block diagram showing the configuration of a video camera according to another embodiment of the invention. A rewind instruction signal RW is given to the record/playback circuit 6 from the system microcomputer 4. A rewind end signal WEN is given to the system microcomputer 4 from the record/playback circuit 6. A character display signal WW is given to the viewfinder VF from the system microcomputer 4. Otherwise, the configuration of the video camera is identical to that of the video camera shown in FIG. 4, and the same component parts as those shown in FIG. 4 are designated by the same reference numerals.

Figure 26:
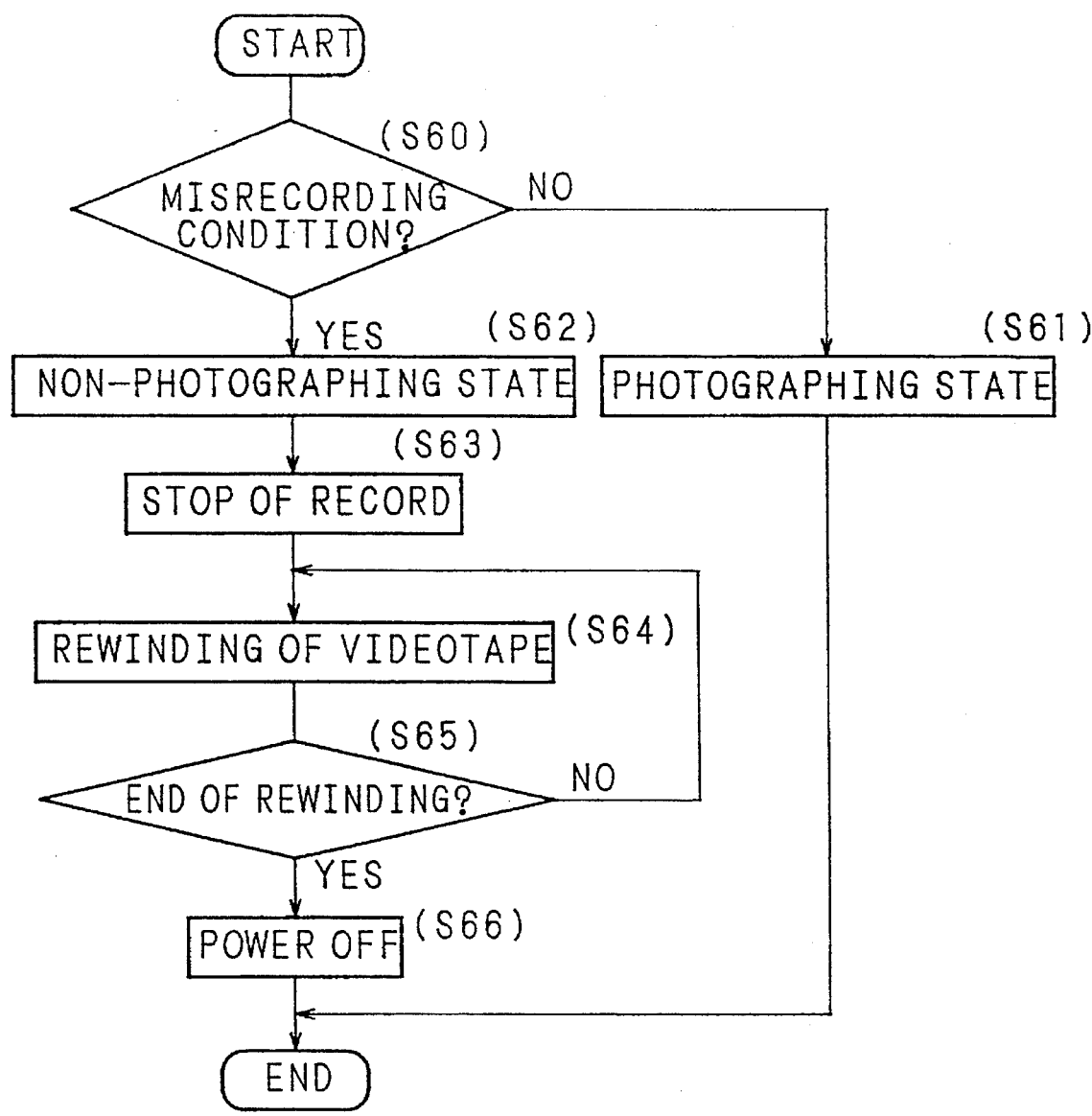
FIG. 26 is a flowchart showing a control procedure for a microcomputer shown in FIG. 25.

The operation of the video camera of the above configuration will be described below with reference to the flowchart of FIG. 26 which shows a control procedure for the system microcomputer 4.

When an angular velocity signal representing the photographing condition is given from the angular velocity sensor 1 to the microcomputer 3 via the amplifier 2, the microcomputer 3 judges whether the photographing condition is normal or not, and supplies the result of the judgement to the system microcomputer 4. The system microcomputer 4 then judges whether the video camera is in a misrecording condition (S60). If it is judged that the video camera is not in a misrecording condition, then it is determined that the video camera is in a normal photographing state based on the intention of the operator (S61), and the control operation is terminated. On the other hand, if it is judged that the video camera is in a misrecording condition, then it is determined that the video camera is not in a normal photographing state but in an abnormal photographing state not based on the intention of the operator (S62), and the recording operation is stopped under control of the system microcomputer 4 (S63).

Next, the system microcomputer 4 gives a rewind instruction signal RW to the record/playback circuit 6 to rewind the recording tape by the amount equivalent to the time during which the misrecording was made, i.e. to the position where the misrecording started (S64). When the rewinding operation is completed, the record/playback circuit 6 gives a rewind end signal WEN to the system microcomputer 4. When the system microcomputer 4 determines that the rewinding operation has been completed (S65), the power supply circuit 11 is cut off (S66), and the control operation is terminated. Thus, in the event that an object is erroneously recorded without intention of the operator, the recording tape is automatically rewound so that the erroneously recorded portions will not remain recorded on the tape, thus recording only objects that have been intentionally photographed by the operator.

Figure 27:
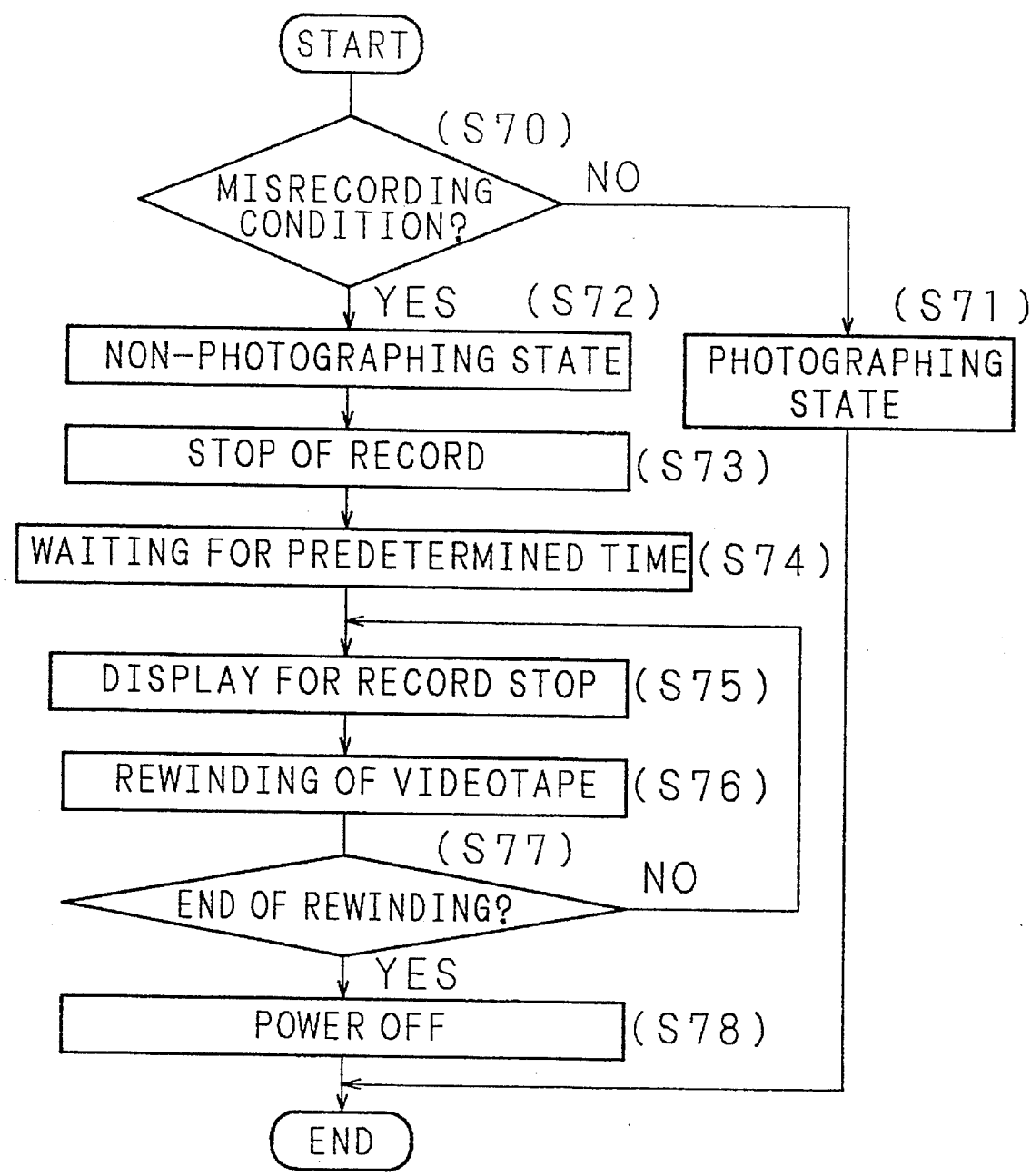
FIG. 27 is a flowchart showing another control procedure for the microcomputer shown in FIG. 25.

Next, the operation of the video camera will be described with reference to the flowchart of FIG. 27 which shows another control procedure for the system microcomputer 4. As in the above-described procedure, when an angular velocity signal representing the photographing condition is given to the microcomputer 3 from the angular velocity sensor 1, the microcomputer 3 judges whether the photographing condition is normal or not, and supplies the result of the judgement to the system microcomputer 4. The system microcomputer 4 then judges whether the video camera is in a misrecording condition (S70). If it is judged that the video camera is not in a misrecording condition, then it is determined that the video camera is in a normal photographing state based on the intention of the operator (S71), and the control operation is terminated.

On the other hand, if it is judged that the video camera is in a misrecording condition, then it is determined that the video camera is not in a normal photographing state but in an abnormal photographing state not based on the intention of the operator (S72), and the recording operation is stopped under control of the system microcomputer 4 (S73), which is followed by a predetermined wait time (S74). During the predetermined wait time, the system microcomputer 4 gives a character display signal WW to the viewfinder VF to display a notice in the viewfinder VF notifying that the recording operation is stopped or that the recording tape is being rewound because of misrecording (S75).

Next, the system microcomputer 4 gives a rewind instruction signal RW to the record/playback circuit 6 to rewind the recording tape by the amount equivalent to the time during which the misrecording was made, i.e. to the position where the misrecording started (S76). The display remains on until the rewinding operation is completed. When the rewinding operation is completed, the record/playback circuit 6 gives a rewind end signal WEN to the system microcomputer 4. When the system microcomputer 4 determines that the rewinding operation has been completed (S77), the power supply circuit 11 is cut off under control of the system microcomputer 4 (S78), and the control operation is terminated. Thus, in the event of misrecording, the recording tape is rewound with a notice displayed in the viewfinder VF notifying that the recording operation has been stopped, so that the operator can avoid photographing during the rewinding of the recording tape. This also ensures recording only of objects that have been intentionally photographed by the operator under proper photographing conditions.

The operation of the video camera will be further described below with reference to FIG. 28 which shows yet another control procedure for the system microcomputer 4. As in the above-described procedure, when an angular velocity signal representing the photographing condition is given to the microcomputer 3 from the angular velocity sensor 1, the microcomputer 3 judges whether the photographing condition is normal or not, and supplies the result of the judgement to the system microcomputer 4.

The system microcomputer 4 then judges whether the video camera is in a misrecording condition (S80). If it is judged that the video camera is not in a misrecording condition, then it is determined that the video camera is in a normal photographing state based on the intention of the operator (S81), and the control operation is terminated. On the other hand, if it is judged that the video camera is in a misrecording condition, then it is determined that the video camera is not in a normal photographing state but in an abnormal photographing state not based on the intention of the operator (S82), and the recording operation is stopped under control of the system microcomputer 4 (S83)

The above step is followed by a predetermined wait time (S84). During the predetermined wait time, the system microcomputer 4 gives a character display signal WW to the viewfinder VF to display a notice in the viewfinder VF notifying that the recording operation is stopped or that the recording tape is being rewound because of misrecording (S85). Next, it is judges whether any photographing operation has been performed during the wait time through the key array 7, etc. provided for photographing operation (S86). If it is determined that no photographing operation has been performed, the power supply circuit 11 is cut off under control of the system microcomputer 4 (S87), and the control operation is terminated.

In this case, rewinding of the recording tape is not performed, so that the misrecorded portions will remain recorded on the recording tape. In other words, if no photographing operation is performed during the time that the record stop display is on, the misrecorded portions can be saved. On the other hand, if any photographing operation is performed during the predetermined time through the key array 7, etc., the recording tape is rewound by the amount equivalent to the time during which the misrecording was made, i.e., to the misrecording start position (S88). The record stop display remains on until the rewinding operation is completed.

When the rewinding operation is completed, the record/playback circuit 6 gives a rewind end signal WEN to the system microcomputer 4. When the system microcomputer 4 determines that the rewinding operation has been completed (S89), the power supply circuit 11 is cut off under control of the system microcomputer 4 (S87), and the control operation is terminated. In this case, if a prescribed key is operated for a photographing operation during the time that the record stop display is on, the recording tape is rewound so that the misrecorded portions will not remain recorded on the recording tape.

Thus, whether to save the misrecorded portions on the recording tape or not can be determined as desired by performing or not performing a key operation for photographing during the time that the record stop display is on.

In this embodiment, the power supply circuit 11 is cut off after the rewinding of the recording tape has been completed. Alternatively, when the microcomputer 3 has determined that the photographing condition is abnormal, the power supply circuit 11 may be cut off under control of the microcomputer 3 to prevent misrecording, and after that, the power supply circuit 11 may be turned on by the operator performing a photographing operation, followed by the operation of the rewind key on the video camera body to rewind the recording tape to the misrecording start position so that the misrecorded portion will not remain recorded on the recording tape. Furthermore, in this embodiment, the record stop or tape rewind notice is displayed in the viewfinder VF, but alternatively, such notice may be displayed on the video camera body.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video camera, having a function to prevent an erroneous recording operation, comprising:

a swing sensor detecting a swinging motion of said video camera;

comparing means for comparing output signal of said swing sensor with a first threshold value;

first counting means for counting a first number of times that said output signal has equaled or exceeded said first threshold value within a first predetermined length of time;

second counting means for counting a second number of times that said first number of times exceeds a second threshold value within a second predetermined length of time longer than said first predetermined length of time;

judging means for judging that said video camera is in a non-photographing state when said second number of times exceeds a third threshold value; and stopping means for stopping a recording operation when said video camera is judged to be in said non-photographing state.

2. A video camera according to claim 1, said comparing means comprising:

means for generating a reference value;

calculating means for calculating a difference of said output signal of said swing sensor and said reference value; and determining means for determining whether said output of said comparing means is a positive value or a negative value;

wherein said first counting means counts said first number of times when said output of said comparing means is positive, and counts a third number of times when said output of said comparing means is negative.

3. A video camera according to claim 2, wherein said reference value is derived from said output signal of said swing sensor when a substantially zero swinging motion is detected by said swing sensor.

4. A video camera according to claim 2, wherein the reference value is derived from a signal obtained by passing the output signal of the swing sensor through a low pass filter.

5. A video camera according to claim 1, wherein the swing sensor includes a first swing sensor for detecting a swinging motion in pitching directions and a second swing sensor for detecting a swinging motion in yawing directions.

6. A video camera according to claim 1, further comprising:

an operation key inputting a control signal for controlling an operation of said judging means; and control means for controlling said second counting means in response to said operation of said operation key so that said second counting means ignores said first number of times counted by said first counting means for a third length of time and said judging means judges that said video camera is in a photographing state.

7. A video camera according to claim 1, wherein when said judging means has judged that said video camera is in said non-photographing state, said stopping means cuts off power of said video camera.

8. A video camera according to claim 7, further comprising:

means for displaying a warning of imminent power off for a predetermined duration of time until said stopping means cuts off power after said judging means has judged that the video camera is not in a photographing state.

9. A video camera according to claim 1, further comprising:

means for issuing a warning sound when said judging means has judged that the video camera is not in a photographing state.

10. A video camera according to claim 1, further comprising:

means for calculating an average value of a video signal produced during a photographing operation;

wherein when said average value is not greater than a predetermined value, said first threshold value with which said output signal of said swing sensor is compared by said comparing means is decreased.

11. A video camera according to claim 1, further comprising:

means for calculating an average value of a video signal produced during a photographing operation;

wherein when said average value is not greater than a predetermined value, said first predetermined length of time during which said counting means counts said output signal of said swing sensor is lengthened.

12. A video camera according to claim 1, further comprising:

rewinding means for rewinding a recording tape to a start position of said non-photographing state; and control means for controlling said stopping means to stop said recording operation, and then controlling said rewinding means to rewind said recording tape to said start position of said non-photographing state, when said video camera is judged to be in said non-photographing state.

13. A video camera according to claim 12 further comprising:

means for operating said rewinding means to rewind said recording tape when a photographing operation has been performed within a predetermined time after said recording operation has been stopped by said stopping means.

14. A video camera according to claim 1, wherein said stopping means includes, means for rewinding a tape in said video camera to a point corresponding to a beginning of said non-photographing state, and means for turning off a power supply after rewinding said tape.

15. A video camera comprising:

a swing sensor having an output signal indicative of a swinging motion of a camera body;

determining means for determining whether said output signal of said swing sensor is equal to or greater than a first predetermined value;

first counting means for counting a first number of times that said output signal of said swing sensor becomes equal to or greater than said first predetermined value within a first predetermined length of time;

second counting means for counting a second number of times that said first number of times exceeds a second predetermined value within a second predetermined length of time longer than said first predetermined length of time; and means for notifying an operator that said video camera is in a faulty photographing condition when said second number of times exceeds a third predetermined value.

16. A video camera according to claim 12, further comprising:

means for disabling said rewinding means from rewinding the recording tape when a photographing operation has not been performed within a predetermined time after the recording operation has been stopped by said stopping means.

17. A video camera according to claim 12, further comprising:

means for displaying information on stopping of said recording operation or rewinding of said recording tape for a predetermined duration of time after said recording operation has been stopped by said stopping means.

18. A video camera, comprising:

a movement sensor detecting a movement of said video camera and outputting a movement signal;

a subtractor having a first input connected to said movement sensor and a second input for receiving a reference signal, said subtractor subtracting said reference signal from said movement signal and outputting a difference signal;

a switch selectively applying said reference signal to said first input to obtain an error signal from said subtractor when said reference signal is applied to said first and second inputs; and a controller storing said error signal and compensating said difference signal based on said stored error signal.

19. A video camera, comprising:

a movement sensor detecting movement of said video camera and outputting a movement signal;

a subtractor having a first input and a second input, and subtracting signals received on said second input from signals received on said first input, said first input receiving a first sum of said movement signal and a reference signal, and said second input receiving said reference signal;

a low pass filter filtering output of said subtractor; and a controller receiving the output of said subtractor and an output of said low pass filter and compensating the output of said subtractor based on the output of said low pass filter.

20. A video camera according to claim 19, further comprising:

a capacitor having a first plate connected to said movement sensor and a second plate connected to said first input of said subtractor;

a first resistor connected to said second plate and said first input;

a second resistor connected to said reference signal and said second input of said subtractor; and a third resistor connected to an output of said subtractor and said second input.

21. A video camera according to claim 19, wherein said controller controls said recording of said video camera including stopping the recording, rewinding a tape and disconnecting a power supply.

22. A video camera according to claim 18, wherein said controller comprises, first counting means for counting a first number of times that said movement signal has equaled or exceeded said first threshold value within said first predetermined length of time, second counting means for counting a second number of times that said first number of times exceeds a second threshold value within a second predetermined length of time longer than said first predetermined length of time, judging means for judging that said video camera is in a non-photographing state when said second number of times exceeds a third threshold value, and stopping means for stopping a recording operation when said video camera is judged to be in said non-photographing state by said judging means.

23. A video camera comprising:

a movement sensor sensing movement of said video camera;

a photographing state circuit, operatively connected to said movement sensor, determining whether said video camera is in a photographing state or in an abnormal photographing state;

a controller operatively connected to said photographing state circuit, and in response to a determination that said video camera is in said abnormal photographing state by said photographing state circuit, stops a recording operation of said video camera for a first predetermined length of time and rewinds a tape after said first predetermined length of time has expired.

24. A video camera according to claim 23, wherein said controller rewinds said tape after said first predetermined length of time has expired only in response to an input from a user interface of said video camera performed during said first predetermined length of time.

25. A video camera according to claim 24, wherein said controller controls said video camera to cut off a power supply after rewinding said tape.

26. A video camera according to claim 23, wherein said photographing state circuit comprises, determining means for determining whether an output signal of said movement sensor is equal to or greater than a first predetermined value, counting means for counting a first number of times that said output signal of said movement sensor becomes equal to or greater than said first predetermined value within a second predetermined length of time, and comparing means for comparing said first number of times counted by said counting means with a second predetermined value, and said controller comprises means for notifying an operator that said video camera is in said abnormal photographing state when a second number of times that said first number of times exceeds said second predetermined value within a third predetermined length of time longer than said second predetermined length of time, exceeds a third predetermined value.

27. A video camera comprising:

a housing;

a light detector having an output indicative of an amount of light outside said housing;

a movement detector detecting movement of said housing and outputting a first value representative of said movement of said housing;

a first circuit counting a first number of times said first value becomes greater than a first threshold value in a first predetermined length of time to create a count, said first threshold value being adjusted in response to said output of said light detector; and a controller controlling an operation of said video camera as a function of said count.

28. A video camera according to claim 27, wherein said first predetermined length of time is adjusted in response to an output of said light detector.

29. A video camera according to claim 28, wherein said light detector includes, a lens provided within said housing for admitting light into said housing, and a camera circuit operatively connected to said lens to convert said light admitted by said lens into electrical signals.

30. A video camera according to claim 29, wherein said first circuit repetitively counting said first number of times said first value is greater than said first threshold value in said first predetermined length of time to create successive counts, calculating a value H indicative of how many of the last M counts are greater than a value GM, and determines that said video camera is in a non-photographing state if H is greater than T, where M, GM, H and T are integers, and said controller controls said operation of said video camera in response to a determination of said non-photographing state by said first circuit.

31. A video camera according to claim 30, wherein said controller controls the operation of said video camera to stop recording in response to the determination of said non-photographing state by said first circuit.

32. A video camera according to claim 30, wherein said controller controls said video camera to rewind a tape in response to said determination of said non-photographing state.

33. A video camera according to claim 30, wherein said controller controls said video camera to disconnect a power supply in response to said determination of said non-photographing state.

34. A video camera according to claim 27, wherein said first circuit comprises, first counting means for counting said first number of times that said first value has equaled or exceeded said first threshold value within said first predetermined length of time, second counting means for counting a second number of times that said first number of times exceeds a second threshold value within a second predetermined length of time longer than said first predetermined length of time, judging means for judging that said video camera is in a non-photographing state when said second number of times exceeds a third threshold value;

and said controller comprises, stopping means for stopping a recording operation when said video camera is judged to be in said non-photographing state.

35. A video camera comprising:

a lens;

a first circuit converting light entering said video camera through said lens into image signals;

a movement sensor, outputting a movement signal proportional to movement of said video camera;

a first counter repetitively counting a first number of times said movement signal is greater than a first threshold value in a first predetermined period of time;

abnormal photographing detector circuit detecting an abnormal photographing condition on the basis of one or more counts created by said first counter; and a light intensity calculator having said image signals of said first circuit as an input, determining a light intensity of light entering said video camera; and wherein, said first threshold value is adjusted in response to said light intensity of said light entering said video camera determined by said light intensity calculator.

36. A video camera according to claim 35, wherein said abnormal photographing detector circuit comprises a second counter counting a second number of times that said first number of times exceeds a second threshold value within a second predetermined length of time longer than said first predetermined length of time, and a judging unit judging that said video camera is in said abnormal photographing condition when said second number of times exceeds a third threshold value; and further comprising stopping means for stopping a recording operation when said video camera is judged to be in said abnormal photographing condition.

37. A video camera comprising:

a movement detector outputting a movement value;

a first circuit calculating a first number equal to a number of times said movement value is positive and said movement value is greater than or equal to a first threshold value in a first predetermined length of time and calculating a second number equal to a number of times said movement value is negative and an absolute value of said movement value is greater than or equal to said first threshold value in said first predetermined length of time; and a second circuit, controlling an operation of said video camera as a function of said first number and said second number.

38. A video camera according to claim 37, wherein said first circuit repetitively calculates a first series of first numbers, each first number of said first series of first numbers equal to a number of times said movement value is positive and said movement value is greater than or equal to said first threshold value in said first predetermined length of time, repetitively calculates a second series of second numbers, each second number of said second series of second numbers equal to a number of times said movement value is negative and an absolute value of said movement value is greater than or equal to said first threshold value in said first predetermined length of time, and wherein said video camera is controlled by said second circuit as a function of the last M first numbers of said first series and the last M second numbers of said second series, where M is an integer.

39. A video camera according to claim 38, wherein said video camera is controlled by said second circuit as a function of a first count of the number of times the last M first numbers of said first series are greater than or equal to GM and a second count of the number of times the last M second numbers of said second series are greater or equal to GM, where GM is an integer.

40. A video camera according to claim 39, wherein said video camera is controlled by said second circuit if it is determined that both said first count and said second count are greater than T, where T is an integer.

41. A video camera according to claim 40, wherein said second circuit disconnects a power supply of said video camera.

42. A video camera according to claim 40, wherein said second circuit controls said video camera to stop recording.

43. A video camera according to claim 40, wherein said second circuit controls said video camera to rewind a tape.

44. A video camera according to claim 40, wherein said second circuit controls said video camera only in the absence of an operator input during a predetermined time period following the determination that said first and second counts are greater than T by the second circuit.

45. A video camera according to claim 44, wherein said movement detector outputs said movement value indicative of said movement of said video camera in a pitch direction.

46. A video camera according to claim 37, wherein said movement detector outputs said movement value indicative of said movement of said video camera in a yaw direction.

47. A video camera according to claim 37, wherein said movement detector outputs said movement value indicative of said movement of said video camera in a pitch and a yaw direction.

48. A video camera according to claim 37, wherein said first circuit comprises means for generating a reference value, calculating means for calculating a difference of said movement value of said movement detector and said first threshold value within said first predetermined length of time, and determining means for determining whether said difference is positive or negative, and counting means counting said first number when said difference is positive, and counting said second number when said difference is negative.

49. A method of controlling a video camera having a function to prevent an erroneous recording operation comprising:

(a) measuring a swinging motion of said video camera;

(b) comparing said measured swinging motion with a first threshold value;

(c) counting a first number of times that said measured swinging motion has equaled or exceeded said first threshold value within a first predetermined length of time;

(d) counting a second number of times that said first number of times exceeds a second threshold value within a second predetermined length of time longer than said first predetermined length of time;

(e) determining that said video camera is in a non-photographing state when said second number of times exceeds a third-threshold value; and (f) stopping said recording operation of said video camera when it is determined that said video camera is in said non-photographing state.

50. The method of claim 49, further comprising the steps of:

(g) rewinding a tape in said video camera to a point corresponding to a beginning of said non-photographing state when it is determined in said step (e) that said video camera is in said non-photographing state; and (h) turning off a power supply after rewinding said tape.

51. A method of operating a video camera comprising:

(a) detecting a movement of said video camera and outputting a movement signal;

(b) subtracting, with a subtractor, a signal received at a first input of said subtractor from a signal received at a second input of said subtractor to produce a difference signal, said first and second inputs receiving a reference signal and said movement signal, respectively;

(c) selectively applying said reference signal to said second input to obtain an error signal from said subtractor when said reference signal is applied to said first and second inputs; and (d) compensating said difference signal based on said error signal.

52. A video camera, comprising:

(a) detecting movement of said video camera and outputting a movement signal;

(b) subtracting, with a subtractor, signals received on a first input of the subtractor from signals received on a second input of the subtractor, said second input receiving a first sum of said movement signal and a reference signal, and said first input receiving said reference signal;

(c) low pass filtering output of said subtractor; and (d) compensating the output of said subtractor based on output of said low pass filter.

53. The method of claim 51, wherein said step (c) comprises the substep of (c1) comparing said difference signal with said first threshold value, (c2) counting said first number of times that said difference signal has equaled or exceeded said first threshold value within a first predetermined length of time, (c3) counting a second number of times that said first number of times exceeds a second threshold value within a second predetermined length of time longer than said first predetermined length of time, and (c4) judging that said video camera is in said non-photographing state when said second number of times exceeds a third threshold value, and the method further comprising stopping a recording operation of said video camera when it is determined that said video camera is in said non-photographing state.

54. A method of controlling a video camera comprising:

(a) sensing movement of the video camera;

(b) determining whether the video camera is in a photographing state or in a non-photographing state based upon the sensed movement in said step (a);

(c) in response to a determination that said video camera is in said non-photographing state in said step (b), (c1) stopping a recording operation of said video camera for a first predetermined length of time, (c2) displaying a notice, and (c3) rewinding a tape after said first predetermined length of time has expired.

55. The method of claim 54, wherein said step (c2) comprises the substep of rewinding said tape after said first predetermined length of time has expired only in response to an input from a user interface of said video camera performed during said first predetermined length of time.

56. The method of claim 55, wherein said step (c) further comprises the substep of (c4) cutting off a power supply after rewinding said tape in said substep (c3).

57. The method of claim 54, wherein said step (b) comprises the substeps of (b1) comparing said sensed movement of said video camera with a first threshold value, (b2) counting a first number of times that said swinging motion sensed in said step (a) has equaled or exceeded said first threshold value within a second predetermined length of time, (b3) counting a second number of times that said first number of times exceeds a second threshold value within a third predetermined length of time longer than said second predetermined length of time, and (b4) determining that said video camera is in said non-photographing state when said second number of times exceeds a third threshold value.

58. A method of controlling a video camera comprising:

(a) sensing movement of said video camera;

(b) determining whether said video camera is in a photographing state or in a non-photographing state on the basis of the sensed movement;

(c) stopping a tape for a first predetermined length of time after said non-photographing state has been determined; and (d) rewinding a tape after said first predetermined length of time has expired.

59. The method of claim 58, further comprising:

(e) displaying a message during said first predetermined length of time.

60. The method of claim 58, wherein said step (b) comprises the substeps of (b1) comparing said sensed movement of said video camera with a first threshold value, (b2) counting a first number of times that said movement sensed in said step (a) has equaled or exceeded said first threshold value within a second predetermined length of time, (b3) counting a second number of times that said first number of times exceeds a second threshold value within a third predetermined length of time longer than said second predetermined length of time, and (b4) determining that said video camera is in said non-photographing state when said second number of times exceeds a third threshold value.

61. A method of controlling a video camera comprising:

(a) detecting an amount of light outside a housing of said video camera;

(b) detecting movevment of said housing and outputting a first value representative of said movement of said housing;

(c) counting a first number of times said first value is greater than a first threshold value in a first predetermined length of time to create a count;

(d) adjusting said first threshold value in response to said amount of light detecting in said step (a); and (e) controlling an operation of said video camera as a function of said count counted in step (c).

62. The method of claim 61 further comprising:

(f) adjusting said first predetermined length of time in response to said amount of light detected in said step (a).

63. The method of claim 62, wherein said step (a) includes the substep of (a1) admitting light into said housing through a lens in said housing, and (a2) converting said light admitted into said housing of said video camera into electrical signals.

64. The method of claim 63, wherein step (d) includes counting the number of times the first value is greater than a threshold value in a first length of time to create successive counts; and said step (e) includes the substeps of (e1) calculating a value H indicative of how many of the last M counts are greater than a value GM, where H, M and GM are integers;

(e2) determining the video camera to be in a non-photographing state if H is greater than T, where T is an integer; and (e3) controlling the operation of said video camera in response to the determination of a non-photographing state in substep (e2).

65. The method of claim 64, wherein substep (e3) includes:

stopping a recording in response to the determination of a non-photographing state in substep (e2).

66. The method of claim 64 wherein substep (e3) includes:

rewinding a tape in response to a determination of said non-photographing state in said substep (e2).

67. The method of claim 64 wherein substep (e3) includes:

disconnecting a power supply in response to a determination of said non-photographing state in said substep (e2).

68. The method of claim 61, wherein said step (c) comprises the substep of (c1) counting a second number of times that said first number of times exceeds a second threshold value within a second predetermined length of time longer than said first predetermined length of time, and (c2) determining that said video camera is in a non-photographing state when said second number of times exceeds a third threshold value, and wherein said step (e) comprises stopping a recording operation of said video camera when it is determined in said step (c2) that said video camera is in said non-photographing state.

69. A method of controlling a video camera comprising:

(a) admitting light through a lens;

(b) converting said light admitted through said lens into image signals;

(c) recording said image signals;

(d) outputting a movement signal proportional to movement of the lens;

(e) repetitively counting a number of times said movement signal output in step (d) is greater than a first threshold value in a first predetermined length of time, repetitively creating a count;

(f) determining an intensity of said light entering said video camera on the basis of said image signals created in said step (b);

(g) adjusting said first predetermined length of time in response to said intensity of said light entering said video camera determined in said step (f);

(h) detecting a non-photographing condition on the basis of one or more counts created in step (e); and (i) stopping a recording of image signals in said step (c) in response to the detection of said non-photographing condition in said step (i).

70. The method of claim 69, further comprising:

(j) adjusting said first threshold value in response to said intensity of said light entering said video camera.

71. The method of claim 69, wherein said step (e) comprises the substeps of (e1) comparing said movement of said video camera sensed in said step (a) with said first threshold value, (e2) counting a first number of times that said swinging motion sensed in said step (a) has equaled or exceeded said first threshold value within said first predetermined length of time, and (e3) counting a second number of times that said first number of times exceeds a second threshold value within a second predetermined length of time longer than said first predetermined length of time and said step (h) comprises the substep of (h1) determining that said video camera is in said non-photographing state when said second number of times exceeds a third threshold value.

72. A method of controlling a video camera comprising:

(a) detecting movement of said video camera;

(b) calculating a first number of times said detected movement is positive and said magnitude of said detected movement is greater than or equal to a first threshold value in a first predetermined length of time;

(c) calculating a second number of times said detected movement is negative and said magnitude of said detected movement is greater than or equal to said first threshold value in said first predetermined length of time; and (d) controlling an operation of said video camera as a function of said first number and said second number.

73. The method of claim 72, further comprising:

repeating said step (b) to obtain a first series of first numbers;

repeating said step (c) to obtain a second series of second numbers; and wherein said step (d) includes controlling said operation of said video camera as a function of the last M first numbers of said first series and the last M second numbers of said second series, where M is an integer.

74. The method of claim 73, wherein step (d) includes the substep of controlling said operation of said video camera as a function of a first count of the number of times said last M first numbers of said first series are greater than or equal to GM and a second count of the number of times said last M second numbers of said second series are greater or equal to GM, where GM is an integer.

75. The method of claim 74, wherein step (d) includes the substep of controlling said video camera only if it is determined that both said first count and said second count are greater than T, where T is an integer.

76. The method of claim 75, wherein said step (d) includes the substep of disconnecting a power supply of said video camera.

77. The method of claim 75, wherein said step (d) includes the substep of stopping a recording of said video camera.

78. The method of claim 75, wherein said step (d) includes the substep of rewinding a tape in said video camera.

79. The method of claim 75, wherein said step (d) includes, the substep of controlling said operation of said video camera only in an absence of an operator input during a second predetermined length of time following a determination that said first and second counts are greater than T.

80. The method of claim 79, wherein said step (a) includes the substep of detecting said movement of said video camera in a pitch direction.

81. The method of claim 79, wherein said step (a) includes the substep of detecting said movement of said video camera in a yaw direction.

82. The method of claim 72, wherein said step (a) includes the substep of detecting said movement of said video camera in a pitch and a yaw direction.

83. The method of claim 72, wherein said step (b) comprises the substeps of (b1) comparing said movement detected in said step (a) with said first threshold value, (b2) counting said first number of times that said movement detected in said step (a) has equaled or exceeded said first threshold value within said first predetermined length of time, (b3) counting a third number of times that said first number of times exceeds a second threshold value within a second predetermined length of time longer than said first predetermined length of time, and (b4) determining that said video camera is in a non-photographing state when said third number of times exceeds a third threshold value, and wherein said step (c) comprises the substeps of (c1) comparing said movement detected in said step (a) with said first threshold value, (c2) counting said second number of times that said movement detected in said step (a) has equaled or exceeded said first threshold value within said first predetermined length of time, (c3) counting a fourth number of times that said first number of times exceeds said second threshold value within said second predetermined length of time longer than said first predetermined length of time, and (c4) determining that said video camera is in said non-photographing state when said fourth number of times exceeds said third threshold value.

* * * * *